United States Patent
Kim et al.

(10) Patent No.: US 11,529,900 B2
(45) Date of Patent: Dec. 20, 2022

(54) ARTIFICIAL INTELLIGENCE MASSAGE APPARATUS AND METHOD FOR DETERMINING RECOMMENDED MASSAGE SETTING IN CONSIDERATION OF ACTIVITY INFORMATION OF USER

(71) Applicant: LG ELECTRONICS INC., Seoul (KR)

(72) Inventors: Sangwon Kim, Seoul (KR); Jaehoon Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 457 days.

(21) Appl. No.: 16/745,174

(22) Filed: Jan. 16, 2020

(65) Prior Publication Data

US 2021/0155136 A1 May 27, 2021

(30) Foreign Application Priority Data

Nov. 25, 2019 (KR) .......................... 10-2019-0152135

(51) Int. Cl.
*B60N 2/90* (2018.01)
*G06N 3/08* (2006.01)
*H04W 4/80* (2018.01)
*A61H 15/00* (2006.01)
*G06N 20/00* (2019.01)

(52) U.S. Cl.
CPC ......... *B60N 2/976* (2018.02); *A61H 15/0078* (2013.01); *G06N 3/08* (2013.01); *G06N 20/00* (2019.01); *H04W 4/80* (2018.02)

(58) Field of Classification Search
USPC ........................................................... 701/36
See application file for complete search history.

(56) References Cited

U.S. PATENT DOCUMENTS

| | | | |
|---|---|---|---|
| 2019/0388296 A1* | 12/2019 | Lee | H04W 4/025 |
| 2020/0086778 A1* | 3/2020 | Jeon | H04W 4/40 |
| 2021/0085558 A1* | 3/2021 | Shin | A61H 9/0078 |
| 2021/0155136 A1* | 5/2021 | Kim | H04W 4/48 |

* cited by examiner

*Primary Examiner* — Pierre E Elisca
(74) *Attorney, Agent, or Firm* — Lee, Hong, Degerman, Kang & Waimey PC

(57) ABSTRACT

Disclosed herein is an artificial intelligence massage apparatus for determining a recommended massage setting including a communication modem, a driver comprising at least one motor, and a processor configured to receive, via the communication modem, identification information from a terminal of a user, identify the user using the received identification information, receive, via the communication modem, activity information of the identified user from the terminal or a health care server, determine a recommended massage setting in consideration of the received activity information and a massage setting log of the identified user, and control the driver based on the determined recommended massage setting.

18 Claims, 17 Drawing Sheets

| Activity information | Concentrated massage part | Recommended massage setting ||||
|---|---|---|---|---|---|
| | | Arm massage strength | Leg massage strength | Back massage strength | Sole massage strength |
| Soccer | Lower body and sole | 2 | 5 | 2 | 5 |
| Weight training | Whole body | 5 | 5 | 5 | 5 |
| Jogging | Lower body and sole | 2 | 5 | 3 | 5 |
| Walk | Sole | 2 | 3 | 3 | 4 |
| Badminton | Upper body and lower body | 5 | 5 | 3 | 3 |

FIG. 13

| Training data | User identification information | Activity information | Recommended massage setting | | | |
|---|---|---|---|---|---|---|
| | | | Arm massage strength | Leg massage strength | Back massage strength | Sole massage strength |
| Training data 1 | User 1 | Soccer | 2 | 5 | 2 | 5 |
| Training data 2 | User 1 | Weight training | 5 | 4 | 5 | 4 |
| Training data 3 | User 2 | Jogging | 2 | 5 | 3 | 5 |
| Training data 4 | User 2 | Weight training | 4 | 4 | 5 | 3 |
| Training data 5 | User 3 | Weight training | 3 | 5 | 3 | 5 |
| Training data 6 | - | Weight training | 5 | 5 | 5 | 5 |

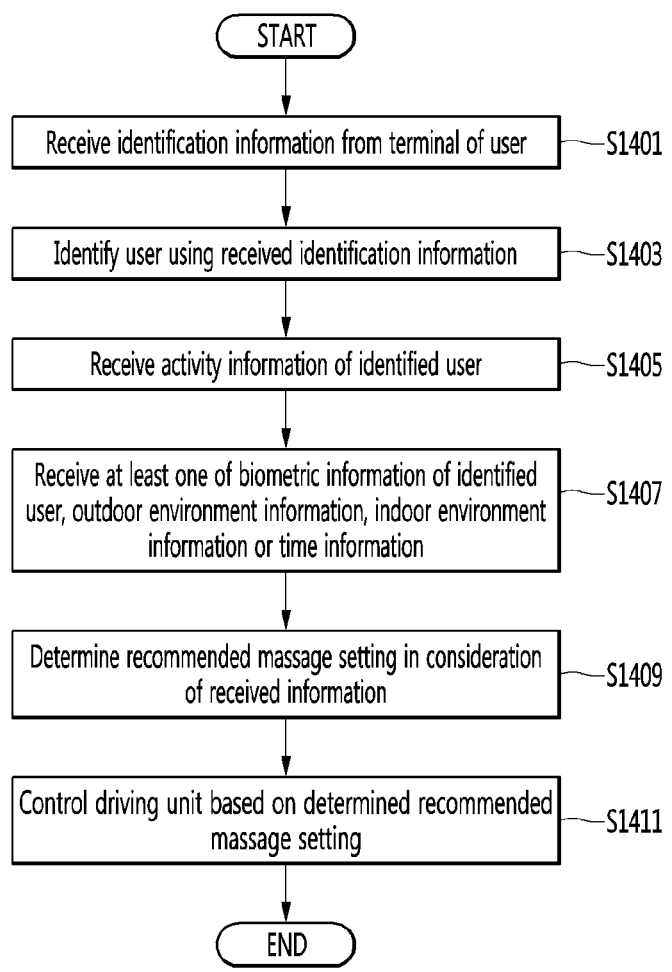

ARTIFICIAL INTELLIGENCE MASSAGE APPARATUS AND METHOD FOR DETERMINING RECOMMENDED MASSAGE SETTING IN CONSIDERATION OF ACTIVITY INFORMATION OF USER

CROSS-REFERENCE TO RELATED APPLICATIONS

Pursuant to 35 U.S.C. § 119 (a), this application claims the benefit of earlier filing date and right of priority to Korean Patent Application No. 10-2019-0152135, filed on Nov. 25, 2019, the contents of which are all hereby incorporated by reference herein in its entirety.

BACKGROUND

The present disclosure relates to an artificial intelligence massage apparatus and method for determining recommended massage setting in consideration of activity information of a user.

Recently, there is a growing demand for massage equipment due to the high demand to loosen the clumped muscles or to relieve fatigue and stress via the massage. Massage is a type of medical adjuvant therapy that involves sweeping, kneading, pressing, pulling, knocking, or moving a body with hands or a special device to aid blood circulation and relieve fatigue. An apparatus for performing massage by a mechanical device is called a massage apparatus, and a typical example of the massage apparatus may be a massage chair in which a user can comfortably sit and receive a massage.

Even though a part to be massaged or a part-by-part massage setting varies according to activity, an existing massage apparatus does not provide a recommended massage setting in consideration of activity of a user or surrounding information. Accordingly, the user should directly input a massage setting.

SUMMARY

An object of the present disclosure is to provide an artificial intelligence massage apparatus and method for determining a recommended massage setting preferred by a user in consideration of activity information of a user.

According to an embodiment, provided are an artificial intelligence massage apparatus and method for identifying a terminal of a user when the terminal of the user is connected via a communication unit, identifying the user from the identified terminal, receiving activity information of the identified user from the connected terminal or a health care server, determining a recommended massage setting corresponding to the identified user based on the received activity information, and controlling a driving unit based on the determined recommended massage setting to perform massage operation.

In addition, according to an embodiment, provided are an artificial intelligence massage apparatus and method for determining a recommended massage setting corresponding to activity information of each user using a recommended massage setting determination model learned using training data generated based on a massage setting log of a user.

According to an embodiment, provided are an artificial intelligence massage apparatus and method for receiving at least one of biometric information of an identified user, outdoor environment information, indoor environment information or time information and determining a recommended massage setting by further considering the received information.

According to an embodiment, provided are an artificial intelligence massage apparatus and method for generating training data for update based on negative feedback of a user on a determined recommended massage setting and updating a recommended massage setting determination model using the generated training data for update.

BRIEF DESCRIPTION OF THE DRAWINGS

The present disclosure will become more fully understood from the detailed description given herein below and the accompanying drawings, which are given by illustration only, and thus are not limitative of the present disclosure, and wherein:

FIG. 11 is a view illustrating examples of a recommended massage setting according to an embodiment of the present disclosure;

FIG. 13 is a view illustrating examples of training data according to an embodiment of the present disclosure;

FIG. 14 is a flowchart illustrating a method of determining a recommended massage setting according to an embodiment of the present disclosure;

DETAILED DESCRIPTION OF THE EMBODIMENTS

Figure 1:
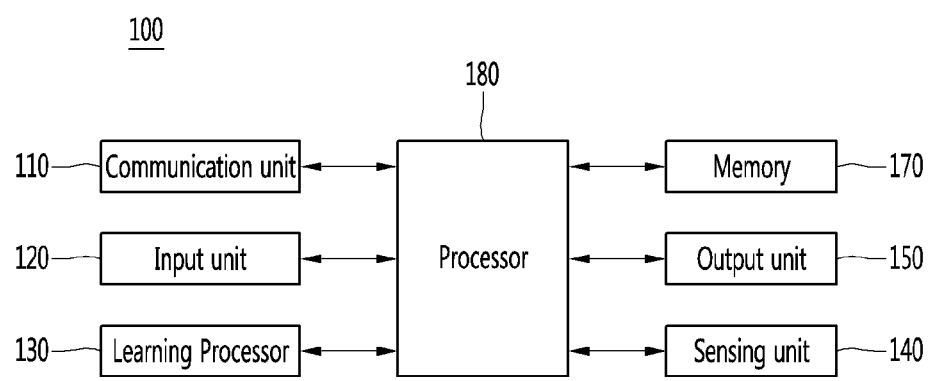
FIG. 1 is a block diagram illustrating an AI apparatus according to an embodiment of the present disclosure.

Hereinafter, embodiments of the present disclosure are described in more detail with reference to accompanying drawings and regardless of the drawings, symbols, same or similar components are assigned with the same reference numerals and thus overlapping descriptions for those are omitted. The suffixes "module" and "unit" for components used in the description below are assigned or mixed in consideration of easiness in writing the specification and do not have distinctive meanings or roles by themselves. In the following description, detailed descriptions of well-known functions or constructions will be omitted since they would obscure the invention in unnecessary detail. Additionally, the accompanying drawings are used to help easily understanding embodiments disclosed herein but the technical idea of the present disclosure is not limited thereto. It should be understood that all of variations, equivalents or substitutes contained in the concept and technical scope of the present disclosure are also included.

It will be understood that the terms "first" and "second" are used herein to describe various components but these components should not be limited by these terms. These terms are used only to distinguish one component from other components.

In this disclosure below, when one part (or element, device, etc.) is referred to as being 'connected' to another part (or element, device, etc.), it should be understood that the former can be 'directly connected' to the latter, or 'electrically connected' to the latter via an intervening part (or element, device, etc.). It will be further understood that when one component is referred to as being 'directly connected' or 'directly linked' to another component, it means that no intervening component is present.

<Artificial Intelligence (AI)>

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method.

The supervised learning may refer to a method of learning an artificial neural network in a state in which a label for training data is given, and the label may mean the correct answer (or result value) that the artificial neural network must infer when the training data is input to the artificial neural network. The unsupervised learning may refer to a method of learning an artificial neural network in a state in which a label for training data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep learning is part of machine learning. In the following, machine learning is used to mean deep learning.

<Robot>

A robot may refer to a machine that automatically processes or operates a given task by its own ability. In particular, a robot having a function of recognizing an environment and performing a self-determination operation may be referred to as an intelligent robot.

Robots may be classified into industrial robots, medical robots, home robots, military robots, and the like according to the use purpose or field.

The robot includes a driving unit may include an actuator or a motor and may perform various physical operations such as moving a robot joint. In addition, a movable robot may include a wheel, a brake, a propeller, and the like in a driving unit, and may travel on the ground through the driving unit or fly in the air.

<Self-Driving>

Self-driving refers to a technique of driving for oneself, and a self-driving vehicle refers to a vehicle that travels without an operation of a user or with a minimum operation of a user.

For example, the self-driving may include a technology for maintaining a lane while driving, a technology for automatically adjusting a speed, such as adaptive cruise control, a technique for automatically traveling along a predetermined route, and a technology for automatically setting and traveling a route when a destination is set.

The vehicle may include a vehicle having only an internal combustion engine, a hybrid vehicle having an internal combustion engine and an electric motor together, and an electric vehicle having only an electric motor, and may include not only an automobile but also a train, a motorcycle, and the like.

Here, the self-driving vehicle may be regarded as a robot having a self-driving function.

<eXtended Reality (XR)>

Extended reality is collectively referred to as virtual reality (VR), augmented reality (AR), and mixed reality (MR). The VR technology provides a real-world object and background only as a CG image, the AR technology provides a virtual CG image on a real object image, and the MR technology is a computer graphic technology that mixes and combines virtual objects into the real world.

The MR technology is similar to the AR technology in that the real object and the virtual object are shown together. However, in the AR technology, the virtual object is used in the form that complements the real object, whereas in the MR technology, the virtual object and the real object are used in an equal manner.

The XR technology may be applied to a head-mount display (HMD), a head-up display (HUD), a mobile phone, a tablet PC, a laptop, a desktop, a TV, a digital signage, and the like. A device to which the XR technology is applied may be referred to as an XR device.

Hereinafter, the AI massage apparatus may be referred to as an artificial intelligence apparatus, and the two terms may be used interchangeably.

FIG. 1 is a block diagram illustrating an AI apparatus 100 according to an embodiment of the present disclosure.

Hereinafter, the AI apparatus 100 may be referred to as a terminal.

The AI apparatus (or an AI device) 100 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI apparatus 100 may include a communication unit 110, an input unit 120, a learning processor 130, a sensing unit 140, an output unit 150, a memory 170, and a processor 180.

The communication unit 110 may transmit and receive data to and from external devices such as other 100a to 100e and the AI server 200 by using wire/wireless communication technology. For example, the communication unit 110 may transmit and receive sensor information, a user input, a learning model, and a control signal to and from external devices.

The communication technology used by the communication unit 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™, RFID (Radio Frequency Identification), Infrared Data Association (IrDA), ZigBee, NFC (Near Field Communication), and the like.

The input unit 120 may acquire various kinds of data.

Here, the input unit 120 may include a camera for inputting a video signal, a microphone for receiving an audio signal, and a user input unit for receiving information from a user. The camera or the microphone may be treated as a sensor, and the signal acquired from the camera or the microphone may be referred to as sensing data or sensor information.

The input unit 120 may acquire a training data for model learning and an input data to be used when an output is acquired by using learning model. The input unit 120 may acquire raw input data. Here, the processor 180 or the learning processor 130 may extract an input feature by preprocessing the input data.

The learning processor 130 may learn a model composed of an artificial neural network by using training data. The learned artificial neural network may be referred to as a learning model. The learning model may be used to an infer result value for new input data rather than training data, and the inferred value may be used as a basis for determination to perform a certain operation.

Here, the learning processor 130 may perform AI processing together with the learning processor 240 of the AI server 200.

Here, the learning processor 130 may include a memory integrated or implemented in the AI apparatus 100. Alternatively, the learning processor 130 may be implemented by using the memory 170, an external memory directly connected to the AI apparatus 100, or a memory held in an external device.

The sensing unit 140 may acquire at least one of internal information about the AI apparatus 100, ambient environment information about the AI apparatus 100, and user information by using various sensors.

Examples of the sensors included in the sensing unit 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output unit 150 may generate an output related to a visual sense, an auditory sense, or a haptic sense.

Here, the output unit 150 may include a display unit for outputting time information, a speaker for outputting auditory information, and a haptic module for outputting haptic information.

The memory 170 may store data that supports various functions of the AI apparatus 100. For example, the memory 170 may store input data acquired by the input unit 120, training data, a learning model, a learning history, and the like.

The processor 180 may determine at least one executable operation of the AI apparatus 100 based on information determined or generated by using a data analysis algorithm or a machine learning algorithm. The processor 180 may control the components of the AI apparatus 100 to execute the determined operation.

To this end, the processor 180 may request, search, receive, or utilize data of the learning processor 130 or the memory 170. The processor 180 may control the components of the AI apparatus 100 to execute the predicted operation or the operation determined to be desirable among the at least one executable operation.

When the connection of an external device is required to perform the determined operation, the processor 180 may generate a control signal for controlling the external device and may transmit the generated control signal to the external device.

The processor 180 may acquire intention information for the user input and may determine the user's requirements based on the acquired intention information.

The processor 180 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 130, may be learned by the learning processor 240 of the AI server 200, or may be learned by their distributed processing.

The processor 180 may collect history information including the operation contents of the AI apparatus 100 or the user's feedback on the operation and may store the collected history information in the memory 170 or the learning processor 130 or transmit the collected history information to the external device such as the AI server 200. The collected history information may be used to update the learning model.

The processor 180 may control at least part of the components of AI apparatus 100 so as to drive an application program stored in memory 170. Furthermore, the processor 180 may operate two or more of the components included in the AI apparatus 100 in combination so as to drive the application program.

Figure 2:
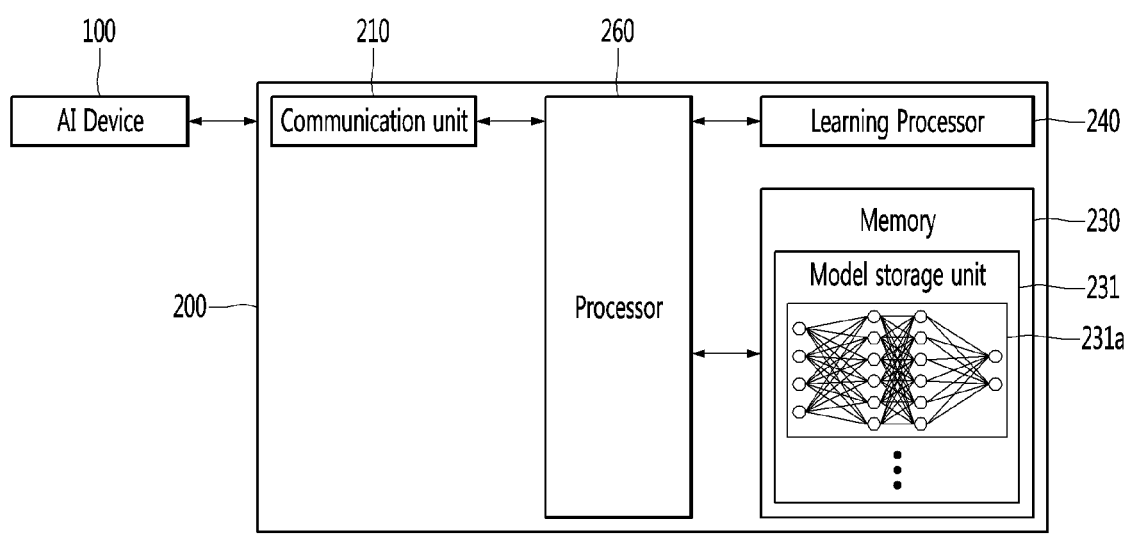
FIG. 2 is a block diagram illustrating an AI server according to an embodiment of the present disclosure.

FIG. 2 is a block diagram illustrating an AI server 200 according to an embodiment of the present disclosure.

Referring to FIG. 2, the AI server 200 may refer to a device that learns an artificial neural network by using a machine learning algorithm or uses a learned artificial neural network. The AI server 200 may include a plurality of servers to perform distributed processing, or may be defined as a 5G network. Here, the AI server 200 may be included as a partial configuration of the AI apparatus 100, and may perform at least part of the AI processing together.

The AI server 200 may include a communication unit 210, a memory 230, a learning processor 240, a processor 260, and the like.

The communication unit 210 can transmit and receive data to and from an external device such as the AI apparatus 100.

The memory 230 may include a model storage unit 231. The model storage unit 231 may store a learning or learned model (or an artificial neural network 231a) through the learning processor 240.

The learning processor 240 may learn the artificial neural network 231a by using the training data. The learning model may be used in a state of being mounted on the AI server 200 of the artificial neural network, or may be used in a state of being mounted on an external device such as the AI apparatus 100.

The learning model may be implemented in hardware, software, or a combination of hardware and software. If all or part of the learning models are implemented in software, one or more instructions that constitute the learning model may be stored in memory 230.

The processor 260 may infer the result value for new input data by using the learning model and may generate a response or a control command based on the inferred result value.

Figure 3:
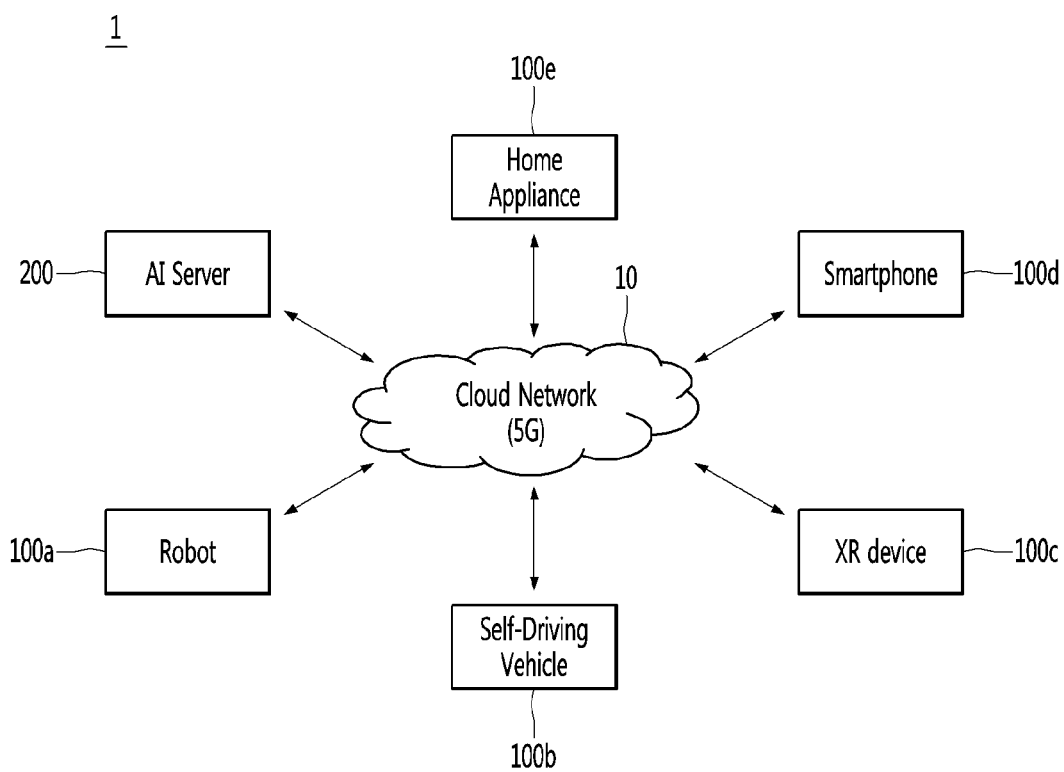
FIG. 3 is a view illustrating an AI system according to an embodiment of the present disclosure.

FIG. 3 is a view illustrating an AI system 1 according to an embodiment of the present disclosure.

Referring to FIG. 3, in the AI system 1, at least one of an AI server 200, a robot 100a, a self-driving vehicle 100b, an XR device 100c, a smartphone 100d, or a home appliance 100e is connected to a cloud network 10. The robot 100a, the self-driving vehicle 100b, the XR device 100c, the smartphone 100d, or the home appliance 100e, to which the AI technology is applied, may be referred to as AI apparatuses 100a to 100e.

The cloud network 10 may refer to a network that forms part of a cloud computing infrastructure or exists in a cloud computing infrastructure. The cloud network 10 may be configured by using a 3G network, a 4G or LTE network, or a 5G network.

That is, the devices 100a to 100e and 200 configuring the AI system 1 may be connected to each other through the cloud network 10. In particular, each of the devices 100a to 100e and 200 may communicate with each other through a base station, but may directly communicate with each other without using a base station.

The AI server 200 may include a server that performs AI processing and a server that performs operations on big data.

The AI server 200 may be connected to at least one of the AI apparatuses constituting the AI system 1, that is, the robot 100a, the self-driving vehicle 100b, the XR device 100c, the smartphone 100d, or the home appliance 100e through the cloud network 10, and may assist at least part of AI processing of the connected AI apparatuses 100a to 100e.

Here, the AI server 200 may learn the artificial neural network according to the machine learning algorithm instead of the AI apparatuses 100a to 100e, and may directly store the learning model or transmit the learning model to the AI apparatuses 100a to 100e.

Here, the AI server 200 may receive input data from the AI apparatuses 100a to 100e, may infer the result value for the received input data by using the learning model, may generate a response or a control command based on the inferred result value, and may transmit the response or the control command to the AI apparatuses 100a to 100e.

Alternatively, the AI apparatuses 100a to 100e may infer the result value for the input data by directly using the learning model, and may generate the response or the control command based on the inference result.

Hereinafter, various embodiments of the AI apparatuses 100a to 100e to which the above-described technology is applied will be described. The AI apparatuses 100a to 100e illustrated in FIG. 3 may be regarded as a specific embodiment of the AI apparatus 100 illustrated in FIG. 1.

<AI+Robot>

The robot 100a, to which the AI technology is applied, may be implemented as a guide robot, a carrying robot, a cleaning robot, a wearable robot, an entertainment robot, a pet robot, an unmanned flying robot, or the like.

The robot 100a may include a robot control module for controlling the operation, and the robot control module may refer to a software module or a chip implementing the software module by hardware.

The robot 100a may acquire state information about the robot 100a by using sensor information acquired from various kinds of sensors, may detect (recognize) surrounding environment and objects, may generate map data, may determine the route and the travel plan, may determine the response to user interaction, or may determine the operation.

The robot 100a may use the sensor information acquired from at least one sensor among the lidar, the radar, and the camera so as to determine the travel route and the travel plan.

The robot 100a may perform the above-described operations by using the learning model composed of at least one artificial neural network. For example, the robot 100a may recognize the surrounding environment and the objects by using the learning model, and may determine the operation by using the recognized surrounding information or object information. The learning model may be learned directly from the robot 100a or may be learned from an external device such as the AI server 200.

Here, the robot 100a may perform the operation by generating the result by directly using the learning model, but the sensor information may be transmitted to the external device such as the AI server 200 and the generated result may be received to perform the operation.

The robot 100a may use at least one of the map data, the object information detected from the sensor information, or the object information acquired from the external device to determine the travel route and the travel plan, and may control the driving unit such that the robot 100a travels along the determined travel route and travel plan.

The map data may include object identification information about various objects arranged in the space in which the robot 100a moves. For example, the map data may include object identification information about fixed objects such as walls and doors and movable objects such as pollen and desks. The object identification information may include a name, a type, a distance, and a position.

In addition, the robot 100a may perform the operation or travel by controlling the driving unit based on the control/interaction of the user. Here, the robot 100a may acquire the intention information of the interaction due to the user's operation or speech utterance, and may determine the response based on the acquired intention information, and may perform the operation.

<AI+Self-Driving>

The self-driving vehicle 100b, to which the AI technology is applied, may be implemented as a mobile robot, a vehicle, an unmanned flying vehicle, or the like.

The self-driving vehicle 100b may include a self-driving control module for controlling a self-driving function, and the self-driving control module may refer to a software module or a chip implementing the software module by hardware. The self-driving control module may be included in the self-driving vehicle 100b as a component thereof, but may be implemented with separate hardware and connected to the outside of the self-driving vehicle 100b.

The self-driving vehicle 100b may acquire state information about the self-driving vehicle 100b by using sensor information acquired from various kinds of sensors, may detect (recognize) surrounding environment and objects, may generate map data, may determine the route and the travel plan, or may determine the operation.

Like the robot 100a, the self-driving vehicle 100b may use the sensor information acquired from at least one sensor among the lidar, the radar, and the camera so as to determine the travel route and the travel plan.

In particular, the self-driving vehicle 100b may recognize the environment or objects for an area covered by a field of view or an area over a certain distance by receiving the sensor information from external devices, or may receive directly recognized information from the external devices.

The self-driving vehicle 100b may perform the above-described operations by using the learning model composed of at least one artificial neural network. For example, the self-driving vehicle 100b may recognize the surrounding environment and the objects by using the learning model, and may determine the traveling route by using the recognized surrounding information or object information. The learning model may be learned directly from the self-driving vehicle 100a or may be learned from an external device such as the AI server 200.

Here, the self-driving vehicle 100b may perform the operation by generating the result by directly using the learning model, but the sensor information may be transmitted to the external device such as the AI server 200 and the generated result may be received to perform the operation.

The self-driving vehicle 100b may use at least one of the map data, the object information detected from the sensor information, or the object information acquired from the external device to determine the travel route and the travel plan, and may control the driving unit such that the self-driving vehicle 100b travels along the determined travel route and travel plan.

The map data may include object identification information about various objects arranged in the space (for example, road) in which the self-driving vehicle 100b travels. For example, the map data may include object identification information about fixed objects such as street lamps, rocks, and buildings and movable objects such as vehicles and pedestrians. The object identification information may include a name, a type, a distance, and a position.

In addition, the self-driving vehicle 100b may perform the operation or travel by controlling the driving unit based on the control/interaction of the user. Here, the self-driving vehicle 100b may acquire the intention information of the interaction due to the user's operation or speech utterance, and may determine the response based on the acquired intention information, and may perform the operation.

<AI+XR>

The XR device 100c, to which the AI technology is applied, may be implemented by a head-mount display (HMD), a head-up display (HUD) provided in the vehicle, a television, a mobile phone, a smartphone, a computer, a wearable device, a home appliance, a digital signage, a vehicle, a fixed robot, a mobile robot, or the like.

The XR device 100c may analyzes three-dimensional point cloud data or image data acquired from various sensors or the external devices, generate position data and attribute data for the three-dimensional points, acquire information about the surrounding space or the real object, and render to output the XR object to be output. For example, the XR device 100c may output an XR object including the additional information about the recognized object in correspondence to the recognized object.

The XR device 100c may perform the above-described operations by using the learning model composed of at least one artificial neural network. For example, the XR device 100c may recognize the real object from the three-dimensional point cloud data or the image data by using the learning model, and may provide information corresponding to the recognized real object. The learning model may be directly learned from the XR device 100c, or may be learned from the external device such as the AI server 200.

Here, the XR device 100c may perform the operation by generating the result by directly using the learning model, but the sensor information may be transmitted to the external device such as the AI server 200 and the generated result may be received to perform the operation.

<AI+Robot+Self-Driving>

The robot 100a, to which the AI technology and the self-driving technology are applied, may be implemented as a guide robot, a carrying robot, a cleaning robot, a wearable robot, an entertainment robot, a pet robot, an unmanned flying robot, or the like.

The robot 100a, to which the AI technology and the self-driving technology are applied, may refer to the robot itself having the self-driving function or the robot 100a interacting with the self-driving vehicle 100b.

The robot 100a having the self-driving function may collectively refer to a device that moves for itself along the given route without the user's control or moves for itself by determining the route by itself.

The robot 100a and the self-driving vehicle 100b having the self-driving function may use a common sensing method so as to determine at least one of the travel route or the travel plan. For example, the robot 100a and the self-driving vehicle 100b having the self-driving function may determine at least one of the travel route or the travel plan by using the information sensed through the lidar, the radar, and the camera.

The robot 100a that interacts with the self-driving vehicle 100b exists separately from the self-driving vehicle 100b and may perform operations interworking with the self-driving function of the self-driving vehicle 100b or interworking with the user who rides on the self-driving vehicle 100b.

Here, the robot 100a interacting with the self-driving vehicle 100b may control or assist the self-driving function of the self-driving vehicle 100b by acquiring sensor information on behalf of the self-driving vehicle 100b and providing the sensor information to the self-driving vehicle 100b, or by acquiring sensor information, generating environment information or object information, and providing the information to the self-driving vehicle 100b.

Alternatively, the robot 100a interacting with the self-driving vehicle 100b may monitor the user boarding the self-driving vehicle 100b, or may control the function of the self-driving vehicle 100b through the interaction with the user. For example, when it is determined that the driver is in a drowsy state, the robot 100a may activate the self-driving function of the self-driving vehicle 100b or assist the control of the driving unit of the self-driving vehicle 100b. The function of the self-driving vehicle 100b controlled by the robot 100a may include not only the self-driving function but also the function provided by the navigation system or the audio system provided in the self-driving vehicle 100b.

Alternatively, the robot 100a that interacts with the self-driving vehicle 100b may provide information or assist the function to the self-driving vehicle 100b outside the self-driving vehicle 100b. For example, the robot 100a may provide traffic information including signal information and the like, such as a smart signal, to the self-driving vehicle 100b, and automatically connect an electric charger to a charging port by interacting with the self-driving vehicle 100b like an automatic electric charger of an electric vehicle.

<AI+Robot+XR>

The robot 100a, to which the AI technology and the XR technology are applied, may be implemented as a guide robot, a carrying robot, a cleaning robot, a wearable robot, an entertainment robot, a pet robot, an unmanned flying robot, a drone, or the like.

The robot 100a, to which the XR technology is applied, may refer to a robot that is subjected to control/interaction in an XR image. In this case, the robot 100a may be separated from the XR device 100c and interwork with each other.

When the robot 100a, which is subjected to control/interaction in the XR image, may acquire the sensor information from the sensors including the camera, the robot 100a or the XR device 100c may generate the XR image based on the sensor information, and the XR device 100c may output the generated XR image. The robot 100a may operate based on the control signal input through the XR device 100c or the user's interaction.

For example, the user can confirm the XR image corresponding to the time point of the robot 100a interworking remotely through the external device such as the XR device 100c, adjust the self-driving travel path of the robot 100a through interaction, control the operation or driving, or confirm the information about the surrounding object.

<AI+Self-Driving+XR>

The self-driving vehicle 100b, to which the AI technology and the XR technology are applied, may be implemented as a mobile robot, a vehicle, an unmanned flying vehicle, or the like.

The self-driving driving vehicle 100b, to which the XR technology is applied, may refer to a self-driving vehicle having a means for providing an XR image or a self-driving vehicle that is subjected to control/interaction in an XR image. Particularly, the self-driving vehicle 100b that is subjected to control/interaction in the XR image may be distinguished from the XR device 100c and interwork with each other.

The self-driving vehicle 100b having the means for providing the XR image may acquire the sensor information from the sensors including the camera and output the generated XR image based on the acquired sensor information. For example, the self-driving vehicle 100b may include an HUD to output an XR image, thereby providing a passenger with a real object or an XR object corresponding to an object in the screen.

Here, when the XR object is output to the HUD, at least part of the XR object may be outputted so as to overlap the actual object to which the passenger's gaze is directed. Meanwhile, when the XR object is output to the display provided in the self-driving vehicle 100b, at least part of the XR object may be output so as to overlap the object in the screen. For example, the self-driving vehicle 100b may output XR objects corresponding to objects such as a lane, another vehicle, a traffic light, a traffic sign, a two-wheeled vehicle, a pedestrian, a building, and the like.

When the self-driving vehicle 100b, which is subjected to control/interaction in the XR image, may acquire the sensor information from the sensors including the camera, the self-driving vehicle 100b or the XR device 100c may generate the XR image based on the sensor information, and the XR device 100c may output the generated XR image. The self-driving vehicle 100b may operate based on the control signal input through the external device such as the XR device 100c or the user's interaction.

Figure 4:
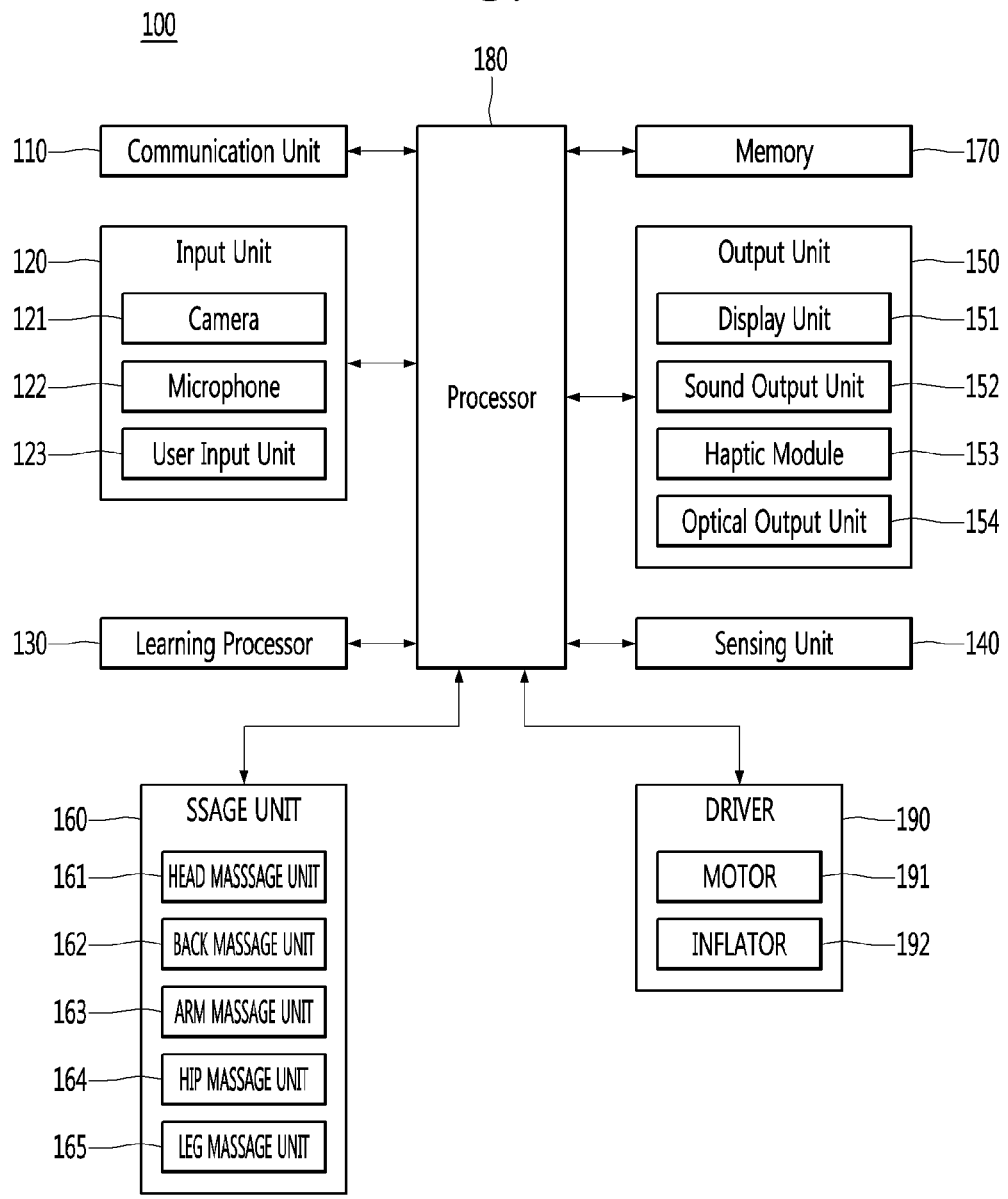
FIG. 4 is a block diagram illustrating an AI apparatus according to an embodiment of the present disclosure.

FIG. 4 is a block diagram illustrating an AI apparatus 100 according to an embodiment of the present disclosure.

The redundant repeat of FIG. 1 will be omitted below.

The communication unit 110 may also be referred to as a communication modem or a communication circuit.

Referring to FIG. 4, the artificial intelligence apparatus 100 may further include a driver 160.

The input unit 120 may include a camera 121 for image signal input, a microphone 122 for receiving audio signal input, and a user input unit 123 for receiving information from a user.

Speech data or image data collected by the input unit 120 are analyzed and processed as the user's control command.

Then, the input unit 120 is used for inputting image information (or signal), audio information (or signal), data, or information inputted from a user and the AI apparatus 100 may include at least one camera 121 in order for inputting image information.

The camera 121 processes image frames such as a still image or a video obtained by an image sensor in a video call mode or a capturing mode. The processed image frame may be displayed on the display unit 151 or stored in the memory 170.

The microphone 122 processes external sound signals as electrical speech data. The processed speech data may be utilized variously according to a function (or an application program being executed) being performed in the AI apparatus 100. Moreover, various noise canceling algorithms for removing noise occurring during the reception of external sound signals may be implemented in the microphone 122.

The user input unit 123 is to receive information from a user and when information is inputted via the user input unit 123, the processor 180 may control an operation of the AI apparatus 100 to correspond to the inputted information.

The user input unit 123 may include a mechanical input means (or a mechanical key, for example, a button, a dome switch, a jog wheel, and a jog switch at the front, back or side of the AI apparatus 100) and a touch type input means. As one example, a touch type input means may include a virtual key, a soft key, or a visual key, which is displayed on a touch screen through software processing or may include a touch key disposed at a portion other than the touch screen.

The sensing unit 140 may also be referred to as a sensor unit.

The sensing unit 140 may include at least one of an electrostatic sensor, a pressure sensor, or a piezoelectric sensor disposed at a portion where the user contacts, and the sensor data for at least one of the contact surface and the intensity of contact when the user contacts the massage chair can be obtained. In this case, the processor 180 may obtain information about at least one of body shape, a posture, or a position of the user based on the sensor data obtained by the sensing unit 140.

The sensor included in the sensing unit 140 is not limited to the above-described electrostatic sensor, pressure sensor, and piezoelectric sensor, and may be any sensor capable of collecting sensor data that may be used to obtain information about at least one of a body shape, posture, and position of the user, such as an inertial sensor, a magnetic sensor, a gravity sensor, a gyroscope sensor, an acceleration sensor, an ultrasonic sensor, an optical sensor, or the like.

The output unit 150 may include at least one of a display unit 151, a sound output module 152, a haptic module 153, or an optical output module 154.

The display unit 151 may display (output) information processed in the AI apparatus 100. For example, the display unit 151 may display execution screen information of an application program running on the AI apparatus 100 or user interface (UI) and graphic user interface (GUI) information according to such execution screen information.

The display unit 151 may be formed with a mutual layer structure with a touch sensor or formed integrally, so that a touch screen may be implemented. Such a touch screen may serve as the user input unit 123 providing an input interface between the AI apparatus 100 and a user, and an output interface between the AI apparatus 100 and a user at the same time.

The sound output module 152 may output audio data received from the wireless communication unit 110 or stored in the memory 170 in a call signal reception or call mode, a recording mode, a speech recognition mode, or a broadcast reception mode.

The sound output module 152 may include a receiver, a speaker, and a buzzer.

The haptic module 153 generates various haptic effects that a user can feel. A representative example of a haptic effect that the haptic module 153 generates is vibration.

The optical output module 154 outputs a signal for notifying event occurrence by using light of a light source of the AI apparatus 100. An example of an event occurring in the AI apparatus 100 includes message reception, call signal reception, missed calls, alarm, schedule notification, e-mail reception, and information reception through an application.

The massage unit 160 is configured to perform massage by being in contact with the user, and may include at least one of a head massage unit 161 supporting the head of the user, a back massage unit 162 supporting the back of the user, an arm massage unit 163 supporting the arm of the user, a hip massage unit 164 supporting the hip of the user, or a leg massage unit 165 supporting the leg of the user. Each of the head massage unit 161, the back massage unit 162, the arm massage unit 163, the hip massage unit 164, and the leg massage unit 165 may include an airbag.

The driving unit 190 may generate a physical movement or physical force for massage through the motor 191 generating a rotational force and may transmit the generated physical movement or physical force to the massage unit 160. For example, the driving unit 190 may move the massage head using the physical force generated by the motor 191 and may massage the body of the user through the movement of the massage head. The massage head may be viewed as a configuration of the driving unit 190 or may be viewed as a configuration of the massage unit 160.

The driving unit 190 may adjust the air pressure of the airbag or the air injection amount into the airbag through an inflator 192 for injecting air into the airbag of the massage unit 160. In other words, the inflator 192 may attempt to supply air to the airbag according to the set supply air pressure, if the air pressure of the airbag is higher than the supply air pressure, the airbag deflates until the air pressure of the airbag is equal to the supply air pressure, and if the air pressure of the airbag is lower than the supply air pressure, the airbag is inflated until the air pressure of the airbag is equal to the supply air pressure.

In particular, the driving unit 190 may adjust the massage intensity by adjusting the rotational speed of the motor 191 or the air pressure or air injection amount of the inflator 192. For example, the driving unit 190 may increase the massage intensity by increasing the rotational speed of the motor 191 or reducing the air pressure of the inflator 192. On the contrary, the driving unit 190 may reduce the massage intensity by reducing the rotational speed of the motor 191 or increasing the air pressure of the inflator 192. Since the airbag is inflated as the air pressure of the airbag increases, the distance between the body of the user and the massage head corresponding to the airbag increases, so that the massage intensity of the body part corresponding to the airbag decreases.

In addition, the artificial intelligence apparatus 100 may further include a heater (not shown) and a blower (not shown). The heater (not shown) may generate and provide heat when current flows using a resistive element and the blower (not shown) may blow air into vents using a fan.

In FIG. 4, the driving unit 190 is illustrated in a configuration separated from the massage unit 160, but the present disclosure is not limited thereto. In an embodiment, each of the head massage unit 161, the back massage unit 162, the arm massage unit 163, the hip massage unit 164, and the leg massage unit 165 included in the massage unit 160 may individually include at least one driving unit 190.

Figure 5:
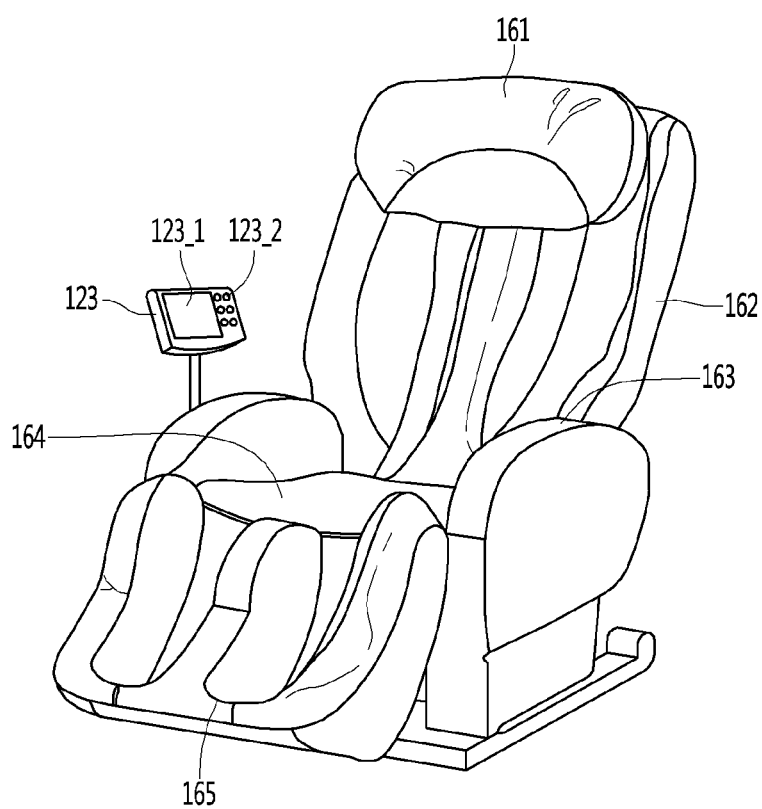
FIG. 5 is a perspective view illustrating an artificial intelligence apparatus according to an embodiment of the present disclosure.

FIG. 5 is a perspective view illustrating an artificial intelligence apparatus 100 according to an embodiment of the present disclosure.

Referring to FIG. 5, the artificial intelligence apparatus 100 or the artificial intelligence massage apparatus 100 may be a massage apparatus in the form of a chair. The massage apparatus in the form of a chair may include not only a general massage chair but also a chair having a massage unit 160, a driving unit 190, and the like, which may provide a massage function or a massage operation.

In one embodiment, the artificial intelligence apparatus 100 may be a car seat including a massage unit 160 and a driving unit 190 to provide a massage function. If the artificial intelligence apparatus 100 is a car seat, the artificial intelligence apparatus 100 may be regarded as a part of the vehicle on which the artificial intelligence apparatus is mounted. For safety, the artificial intelligence apparatus 100 may operate only in a situation in which the vehicle is self-driving.

The artificial intelligence apparatus 100 may include at least one of a head massage unit 161 supporting the head of the user, a back massage unit 162 supporting the back of the user, an arm massage unit 163 supporting the arm of the user, a hip massage unit 164 supporting the hip of the user, or a leg massage unit 165 supporting the leg of the user.

Each of the head massage unit 161, the back massage unit 162, the arm massage unit 163, the hip massage unit 164, and the leg massage unit 165 may include one or more massage heads, and, by operating by physical movement or physical force generated from the motor 191 of the driving unit 190, each massage head can massage at least a part of the body of the user. Each massage head may include one or more massage rods.

Meanwhile, each of the head massage unit 161, the back massage unit 162, the arm massage unit 163, the hip massage unit 164, and the leg massage unit 165 may include at least one lower massager. For example, the head massage unit 161 may include at least one of a head massager that can massage the head of the user and a neck massager that can massage the neck of the user. The back massage unit 162 may include at least one of a shoulder massager that can massage the shoulder of the user, a back massager that can massage the back of the user, and a waist massager that can massage the waist of the user. The leg massage unit 165 may include at least one of a thigh massager that can massage the thigh of the user, a calf massager that can massage the calf of the user, and a foot massager that can massage the foot of the user.

In addition, the artificial intelligence apparatus 100 may include a user input unit 123 or a user interface unit. The user input unit 123 may include a display unit 123_1 that displays information under the control of the processor 180, and an input unit 123_2 that receives an input from a user and transmits the input to the processor 180. The display unit 123_1 included in the user input unit 123 may refer to the display unit 151 of the output unit 150.

Figure 6:
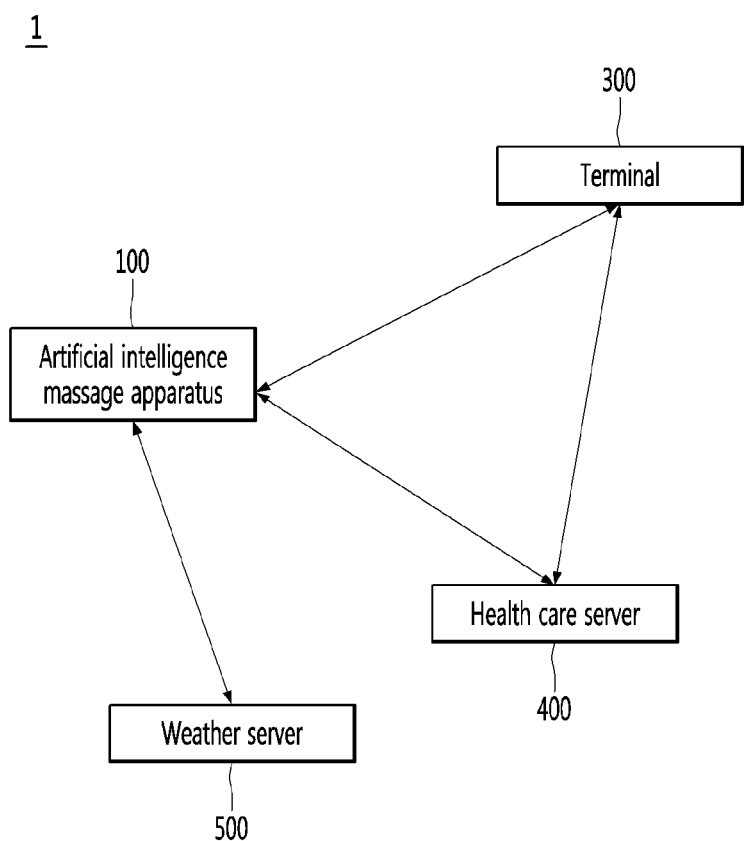
FIG. 6 is a block diagram illustrating an AI system according to an embodiment of the present disclosure.

FIG. 6 is a block diagram illustrating an AI system 1 according to an embodiment of the present disclosure.

Referring to FIG. 6, the AI system 1 may include an artificial intelligence apparatus or an artificial intelligence massage apparatus 100, a terminal 300 of a user, a health care server 400 and a weather server 500. The artificial intelligence massage apparatus 100, the terminal 300, the heath care server 400 and the weather server 500 may communicate with each other using at least one of wired communication technology, wireless communication technology or short-range communication technology.

The terminal 300 may generate (or collect), manage or store activity information of the user and may include a mobile terminal such as a smartphone. The terminal 300 may be connected to other health care apparatuses such as a smart band via the communication unit to collect sensor information or the activity information of the user. For example, the terminal 300 may generate the activity information of the user using sensor information received from a sensor mounted therein and sensor information received from the connected smart band.

The sensor information collected by the terminal 300 may include gyro sensor information, acceleration sensor information, biometric sensor information, etc., and the biometric sensor information may include pulse sensor information, blood pressure sensor information, blood flow rate sensor information, body temperature sensor information, bioelectric sensor information used in bioelectric impedance analysis (BIA), etc.

The terminal 300 may generate the activity information of the user based on at least one of the collected sensor information or user input. The terminal 300 may determine the activity of the user from the sensor information to generate the activity information and modify the generated activity information based on the user input or generate new activity information. For example, the terminal 300 may determine that running activity is detected from the collected sensor information and generate running activity information. When the user inputs a soccer instead of running, the terminal 300 may change the generated running activity information to soccer activity information. Alternatively, even if the terminal 300 does not detect the activity of the user from the sensor information as in the case where the user acts without the terminal 300 or the health care apparatus, when the user inputs a specific activity in a certain period of time, the terminal 300 may generate the activity information based on the user input.

The terminal 300 may have a speech recognition function and recognize the speech of the user to control the function of the artificial intelligence massage apparatus 100.

The heath care server 400 refers to an apparatus for storing or managing the activity information of various users. The heath care server 400 may be implemented in the form of a single server, cluster server or cloud server. The heath care server 400 may receive and manage user-by-user activity information from the plurality of plurality of terminals 300, and the heath care server 400 may transmit the activity information of a specific user to the artificial intelligence massage apparatus 100 periodically or according to the request of the artificial intelligence massage apparatus 100.

The weather server 500 refers to an apparatus for generating or managing weather information. The weather server 500 may be implemented in the form of a single server, cluster server or cloud server. The weather server 500 may transmit the weather information to the artificial intelligence massage apparatus 100 in real time, periodically or according to the request of the artificial intelligence massage apparatus 100.

In one embodiment, at least one of the heath care server 400 or the weather server 500 may be implemented as one server along with the artificial intelligence server 200.

In one embodiment, the heath care server 400 or the weather server 500 may communicate with the artificial intelligence apparatus 100 via the artificial intelligence server 200.

The terminal 300 may transmit generated biometric information along with terminal identification information or user identification information to the artificial intelligence massage apparatus 100 or the heath care server 400 in real time or periodically. Alternatively, the terminal 300 may transmit, to the artificial intelligence massage apparatus 100, biometric information accumulated from a previous connection, when being connected to the artificial intelligence massage apparatus 100.

Figure 7:
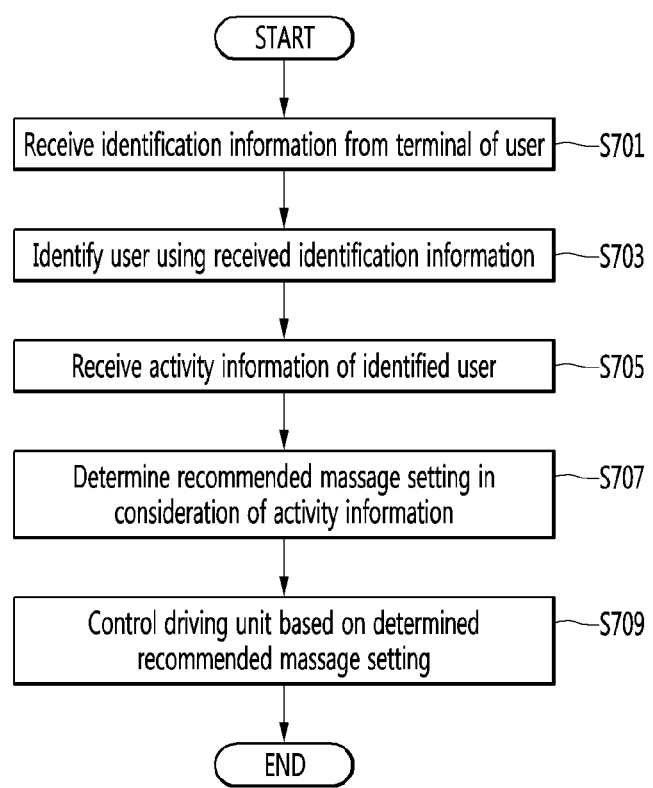
FIG. 7 is a flowchart illustrating a method of determining a recommended massage setting according to an embodiment of the present disclosure.

FIG. 7 is a flowchart illustrating a method of determining a recommended massage setting according to an embodiment of the present disclosure.

Referring to FIG. 7, the processor 180 of the artificial intelligence massage apparatus 100 receives identification information from the terminal 300 of the user via the communication unit 110 (S701).

The communication unit 110 may receive identification information from the terminal 300 of the user using short-range communication technology or wired/wireless communication technology when the terminal 300 of the user approaches. The short-range communication technology may include NFC (Near Field Communication), RFID (Radio-Frequency Identification), Bluetooth, etc. For example, when a short-range communication tag or a short-range communication beacon is included in the communication unit 110 of the artificial intelligence massage apparatus 100 and the terminal 300 of the user is adjacent to or is brought into contact with the short-range communication tag or the short-range communication beacon, the communication unit 110 may receive the identification information from the terminal 300 of the user, which is adjacent thereto or brought into contact therewith.

The identification information received from the terminal 300 of the user may include at least one of the identification information of the terminal 300 for identifying the terminals 300 or the user identification information for identifying the users who use the terminal 300. The identification information of the terminal 300 may include a terminal serial number, a terminal name, a terminal type, etc. and the user identification information may include a user name, a user ID, a user gender, a user age, etc.

In addition, the processor 180 of the artificial intelligence massage apparatus 100 identifies the user using the received identified information (S703).

The processor 180 may identify the terminal 300 based on the identification information of the terminal 300, and identify the user by identifying the user registered with respect to the identified terminal 300. Alternatively, the processor 180 may identify the user based on the user identification information.

In one embodiment, although the processor 180 identifies the terminal 300 based on the identification information of the terminal 300, but fails to identify a user, such as when a plurality of users is registered in the identified terminal 300, the processor 180 may request authentication for user identification. For example, the processor 180 may output a list of a plurality of users via the output unit 150 and identify the user based on response input of the user; and the processor 180 may output a notification for requesting additional authentication via the output unit 150 and identify the user based on biometric information recognition, such as fingerprint recognition or speech recognition, of the user.

In addition, the processor 180 of the artificial intelligence massage apparatus 100 receives the activity information of the identified user from the terminal 300 of the user or the heath care server 400 via the communication unit 110 (S705).

The processor 180 may obtain a final reception time of the activity information of the identified user and receive the collected activity information after the final reception time from the terminal 300 or the heath care server 400. In addition, the processor 180 may store the received activity information in the memory 170.

The activity information of the user may be manually generated by user input or may be automatically generated based on sensor information or schedule information. For example, the activity content of the user may be determined based on the pattern of the sensor information collected from a plurality of sensors or the schedule information of the user, and the activity information may be generated to include the determined activity content.

In one embodiment, the processor 180 may receive the schedule information of the identified user from the terminal 300 of the user via the communication unit 110, and generate new activity information or modify the received activity information based on the received schedule information. For example, if the user is supposed to play tennis at a specific time according to the received schedule information of the specific user and it is determined that the user has performed an unidentified exercise at the specific time according to the received activity information, the processor 180 may modify the activity content of the received schedule information to "tennis".

In addition, the processor 180 of the artificial intelligence massage apparatus 100 determines a recommended massage setting in consideration of the received activity information (S707).

The recommended massage setting may include a recommended massage course and a massage course detailed setting. The massage course detailed setting may include a massage schedule setting, an additional function setting, a massage part setting, a massage order setting, a massage strength setting, a massage time setting, etc. The massage function setting may include various additional function settings such as a heating function, a cooling function, a multimedia function, etc. The heating/cooling function setting may include whether the heating/cooling function is used and the strength of the heating/cooling function.

The processor 180 may determine the recommended massage setting based only on the activity information, or may determine the recommended massage setting based on the user identification information (e.g., user ID) of the identified user, the activity information of the identified user and a massage setting log of the identified user in order to determine the recommended massage setting according to user preference.

The memory 170 may store default massage setting values corresponding to the activity information. In addition, the processor 180 may determine the default massage setting value as a recommended massage setting value if the user is not identified or if there is no massage setting log of the identified user.

The processor 180 may determine the recommended massage setting from the user identification information and the activity information using a first recommended massage setting determination model stored in the memory 170. Alternatively, the processor 180 may transmit the user identification information and the activity information to the artificial intelligence server 200 via the communication unit 110, and, when the processor 260 of the artificial intelligence server 200 determines a recommended massage operation setting from the user identification information and the activity information using the first recommended massage setting determination model stored in the memory 230, the processor 180 may receive the determined recommended massage setting from the artificial intelligence server 200 via the communication unit 110.

The first recommended massage setting determination model may output the recommended massage setting suitable for the massage setting log of the user, when the user identification information and the activity information are input. In addition, the first recommended massage setting determination model may output the recommended massage setting having a default massage setting value corresponding to the activity information, when only the activity information is input. The first recommended massage setting determination model includes an artificial neural network and may be learned using a machine learning algorithm or a deep learning algorithm.

The first recommended massage setting determination model may be learned using default training data without distinction of the user and personalized training data distinguished between users. The default training data may include activity information and a default massage setting value as label information. The personalized training data may include the user identification information of a specific user, the activity information of the specific user, and a user massage setting value as label information. That is, the massage setting log of the user is used to generate the personalized training data, and thus the massage setting log of the user is applied to the first recommended massage setting determination model. As the first recommended massage setting determination model is learned using the default training data and the personalized training data, the first recommended massage setting determination model may determine a default massage setting value as the recommended massage setting value with respect to an unidentified user or a user without a usage log, and determine a massage setting value determined based on the activity content and massage setting log of the user as the recommended massage setting with respect to an identified user having a usage log.

Further, the processor 180 may determine the recommended massage setting by further considering time information, weather information, biometric information of the user, an indoor temperature, etc. in addition to the user identification information, the activity information and the massage setting record. This will be described below.

In addition, the processor 180 of the artificial intelligence massage apparatus 100 controls the driving unit 190 based on the determined recommended massage setting (S709).

The processor 180 may perform massage operation suitable for the activity of the user, by controlling the driving unit 190 based on the determined recommended massage setting. In addition, if the recommended massage setting has a heating function or a blowing function, the processor 180 may drive a heater (not shown) or a blower (not shown) as well as the driving unit 190 based on the determined recommended massage setting.

The order of the steps shown in FIG. 7 is merely an example and the present disclosure is not limited thereto. That is, in one embodiment, the order of some of the steps shown in FIG. 7 may be changed. In addition, in one embodiment, some of the steps shown in FIG. 7 may be performed in parallel.

Figure 8:
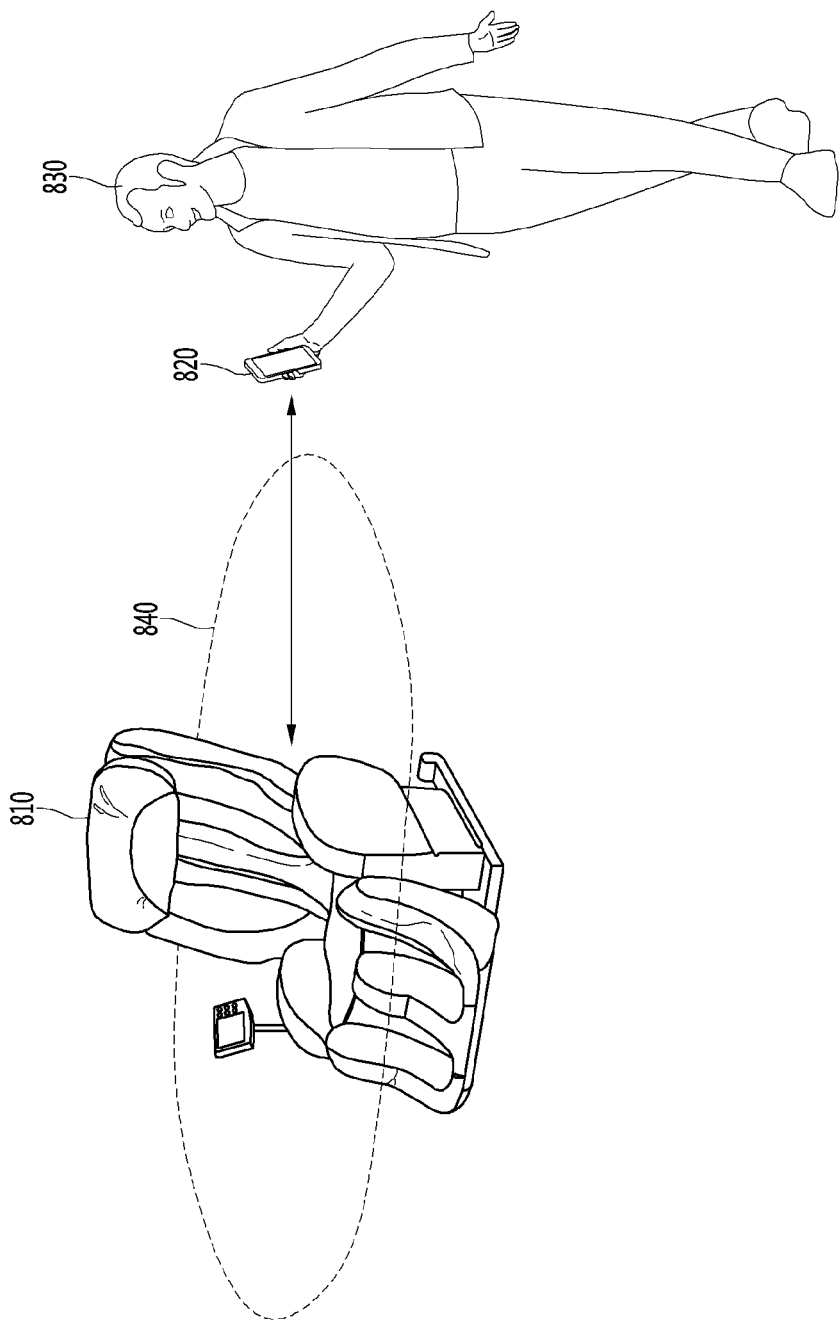
FIG. 8 is a view illustrating an example in which an artificial intelligence massage apparatus according to an embodiment of the present disclosure identifies a user.

FIG. 8 is a view illustrating an example in which an artificial intelligence massage apparatus according to an embodiment of the present disclosure identifies a user.

Referring to FIG. 8, the artificial intelligence massage apparatus 810 may be connected with the pre-registered or paired terminal 820 of a user 830 using wireless communication technology. For example, the artificial intelligence massage apparatus 810 may communicate with the terminal 820 via Bluetooth or Wi-Fi Direct communication.

The artificial intelligence massage apparatus 810 may identify the user 830 by identifying the terminal 820 when the terminal 820 is connected, and identify the user 830 by identifying the terminal 820 when the connected terminal 820 approaches within a predetermined distance 840. The artificial intelligence massage apparatus 810 may calculate the distance to the terminal 820 based on the connection strength with the terminal 820 and determine whether the terminal 820 approaches within the predetermined distance 840 based on the calculated distance.

The artificial intelligence massage apparatus 810 may receive the activity information of the identified user 830 from the connected terminal 820, when the terminal 820 is connected or when the terminal 820 approaches within the predetermined distance 840.

Figure 9:
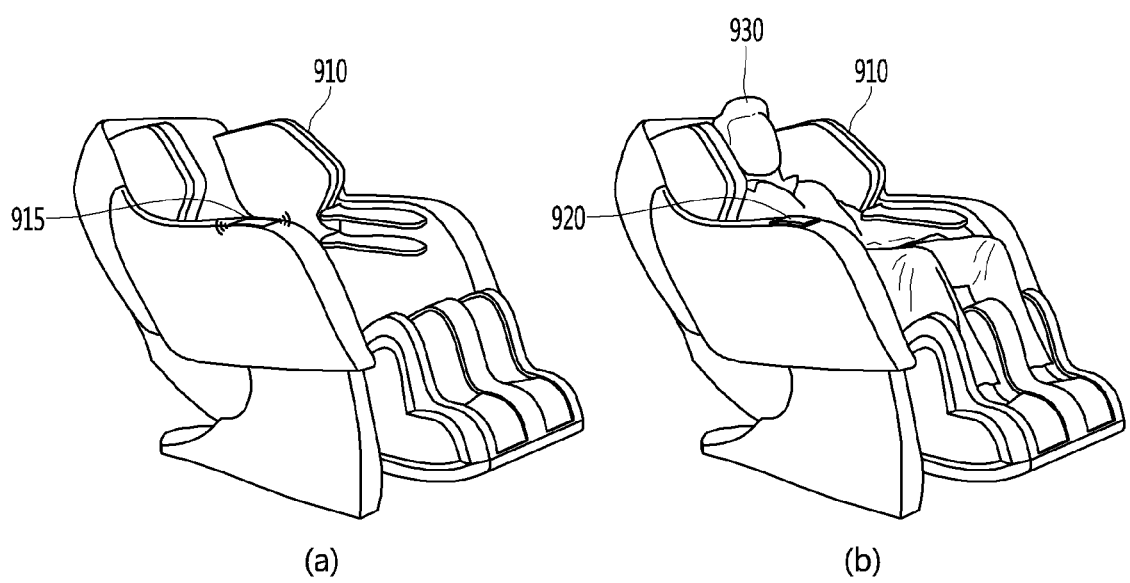
FIG. 9 is a view illustrating an example in which an artificial intelligence massage apparatus according to an embodiment of the present disclosure identifies a user.

FIG. 9 is a view illustrating an example in which an artificial intelligence massage apparatus according to an embodiment of the present disclosure identifies a user.

Referring to FIG. 9, the artificial intelligence massage apparatus 910 may be connected to the pre-registered or paired terminal 920 of a user 930 using short-range communication technology. For example, the artificial intelligence massage apparatus 910 may include a short-range communication tag 915 and communicate with the terminal 920 via tagging of a short-range communication tag 915.

The artificial intelligence massage apparatus 910 may identify the user 930 by identifying the terminal 920 when the terminal 920 is connected, and receive the activity information of the identified user 930 from the connected terminal 920.

Although the embodiment in which the terminal is recognized using short-range communication technology and the user is identified is described in FIG. 9, the present disclosure is not limited thereto. In one embodiment, the artificial intelligence massage apparatus 100 may receive speech data of the speech of the user via the microphone 122 and identify the user via voiceprint analysis from the received speech data. In addition, in one embodiment, the artificial intelligence massage apparatus 100 may include a fingerprint sensor (not shown) in the sensor unit 140 and recognize the fingerprint of the user using the fingerprint sensor to identify the user.

Figure 10:
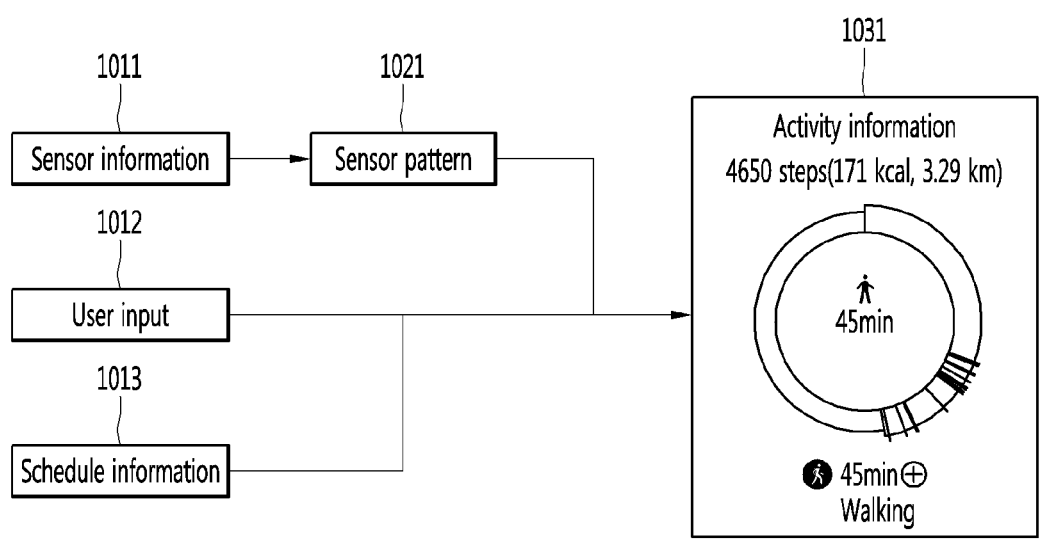
FIG. 10 is a view illustrating an example of activity information according to an embodiment of the present disclosure.

FIG. 10 is a view illustrating an example of activity information according to an embodiment of the present disclosure.

Referring to FIG. 10, the activity information 1031 of the user may be generated based on at least one of sensor information 1011, user input 1012 or schedule information 1013.

The terminal 300 may generate the activity information 1031 of the user based on the sensor pattern 1021 of the sensor information 1011 collected by the sensor. The terminal 300 may generate new activity information 1031 or modify the generated activity information based on at least one of the user input 1012 or the schedule information 1013 of the user. In addition, the terminal 300 may transmit the generated the activity information 1031 to the heath care server 400.

In one embodiment, the artificial intelligence massage apparatus 100 may receive the generated activity information 1031 from the terminal 300 or the heath care server 400, receive the schedule information 1013 of the user from a separate schedule management server (not shown), and modify the received activity information 1031 using the received schedule information 1013. For example, when the artificial intelligence massage apparatus 100 receives, from the terminal 300, activity information including unknown activity during a specific time and receives schedule information including a "tennis" activity engagement during the specific time from a schedule management server (not shown), the artificial intelligence massage apparatus 100 may modify the activity content during the specific time from the unknown activity to "tennis" in the received activity information.

FIG. 11 is a view illustrating examples of a recommended massage setting according to an embodiment of the present disclosure.

Referring to FIG. 11, the processor 180 of the artificial intelligence massage apparatus 100 may determine a concentrated massage part 1120 from the activity information 1110 of the user and determine a recommended massage setting 1130 based on the determined concentrated massage part 1120. The recommended massage setting 1130 may include an arm massage strength 1131, a leg massage strength 1132, a back massage strength 1133, a sole massage strength 1134, etc., but the present disclosure is not limited thereto.

For example, the processor 180 may determine the lower body and the sole as the concentrated massage part with respect to the activity information 1110 such as soccer or jogging in which the lower body is used, and thus set the leg massage strength 1132 or the sole massage strength 1134 to be higher than the massage strengths of the other parts. In addition, the processor 180 may determine the whole body as the concentrated massage part 1120 with respect to the activity information 1110 such as weight training in which the whole body is used, and thus set the massage strengths of all parts to be high.

Even in the same activity, since the preferred massage setting differs between users, the processor 180 may determine the recommended massage setting 1130 in consideration of the user or the user identification information as well as the activity information 1110.

Figure 12:
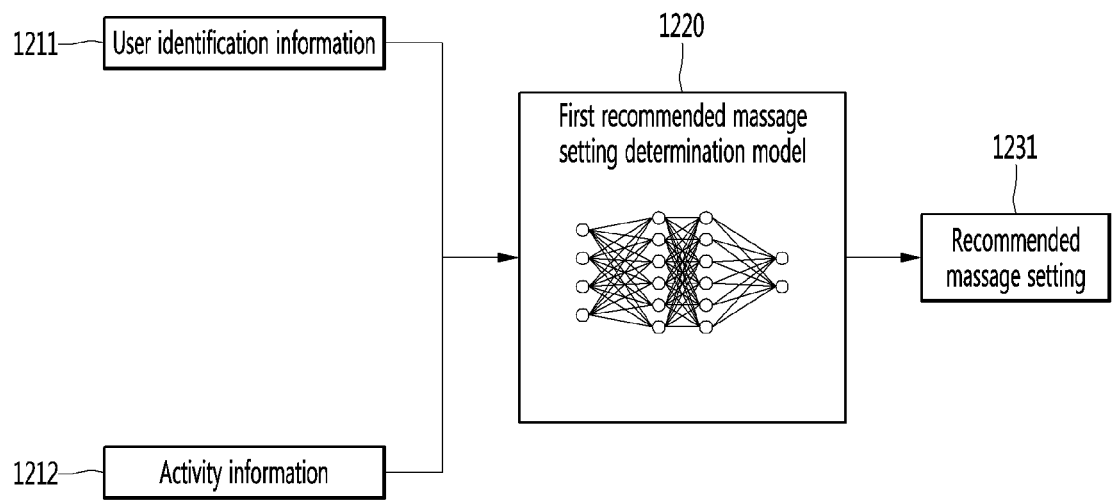
FIG. 12 is a view illustrating a method of determining a recommended massage setting according to an embodiment of the present disclosure.

FIG. 12 is a view illustrating a method of determining a recommended massage setting according to an embodiment of the present disclosure.

Referring to FIG. 12, the artificial intelligence massage apparatus 100 may determine a recommended massage setting 1231 from user identification information 1211 and activity information 1212 using a first recommended massage setting determination model 1220.

The first recommended massage setting determination model 1220 includes an artificial neural network and may be learned using a machine learning algorithm or a deep learning algorithm. Training data used for learning of the first recommended massage setting determination model 1220 may include the user identification information 1211, the activity information 1212 and massage settings or massage setting values as label information. The first recommended massage setting determination model 1220 may be learned to output the recommended massage setting following the massage setting values included in the training data corresponding thereto, when the user identification information 1211 and the activity information 1212 are given.

The first recommended massage setting determination model 1220 may be learned in the processor 180 or the learning processor 130 of the artificial intelligence massage apparatus 100 and stored in the memory 170 of the artificial intelligence massage apparatus 100 or may be learned in the processor 260 or the learning processor 240 of the artificial intelligence server 200 and stored in the memory 170 of the artificial intelligence massage apparatus 100. Alternatively, the first recommended massage setting determination model 1220 may be learned in the processor 260 or the learning processor 240 of the artificial intelligence server 200 and stored in the memory 230 of the artificial intelligence server 200.

When the first recommended massage setting determination model 1220 is stored in the memory 170 of the artificial intelligence massage apparatus 100, the processor 180 of the artificial intelligence massage apparatus 100 may determine the recommended massage setting 1231 using the first recommended massage setting determination model 1220 stored in the memory 170.

Alternatively, when the first recommended massage setting determination model 1220 is not stored in the memory 170 of the artificial intelligence massage apparatus 100, the processor 180 of the artificial intelligence massage apparatus 100 may receive the first recommended massage setting determination model 1220 from the artificial intelligence server 200 via the communication unit 110, store the first recommended massage setting determination model 1220 in the memory 170, and determine the recommended massage setting 1231 using the first recommended massage setting determination model 1220 stored in the memory 170.

Alternatively, when the first recommended massage setting determination model 1220 is not stored in the memory 170 of the artificial intelligence massage apparatus 100, the processor 180 of the artificial intelligence massage apparatus 100 may transmit the user identification information 1211 and the activity information 1212 to the artificial intelligence server 200 via the communication unit 110, the processor 260 of the artificial intelligence server 200 may determine the recommended massage setting 1231 using the first recommended massage setting determination model 1220 stored in the memory 240, and the processor 180 of the artificial intelligence massage apparatus 100 may receive the determined recommended massage setting 1231 from the artificial intelligence server 200 via the communication unit 110.

FIG. 13 is a view illustrating examples of training data according to an embodiment of the present disclosure.

Referring to FIG. 13, training data 1310 used for learning of the first recommended massage setting determination model may include user identification information 1320, activity information 1330 and massage settings 1340 as label information. The massage settings 1340 may include an arm massage strength 1341, a leg massage strength 1342, a back massage strength 1343 and a sole massage strength 1344.

Training data 1 1351 and Training data 2 1352 are training data for User 1, Training data 3 1353 and Training data 4 1354 are training data for User 2, Training data 5 1355 is training data for User 3, and Training data 6 1356 is training data or default training data for an unidentified user.

Comparing Training data 1 1351 and Training data 2 1352, Training data 1 1351 and Training data 2 1352 are for the same User 1and the activity information 1330 corresponding thereto is "soccer" and "weight training" and is different, therefore, the massage settings 1340 may be different. Similarly, comparing Training data 3 1353 and Training data 4 1354, Training data 3 1353 and Training data 4 1354 are for the same User 2 and the activity information 1330 corresponding thereto is "jogging" and "weight training" and is different, therefore, the massage settings 1340 may be different.

Comparing Training data 2 1352, Training data 4 1354, Training data 5 1355 and Training data 6 1356, yet the activity information 1330 corresponding thereto is "weight training" and is the same, but the user identification information 1320 is different from each other, therefore, the massage settings 1340 may be different from each other. For example, according to Training data 6 1356, the massage settings 1340 for "weight training" of the unidentified user are (5, 5, 5, 5) in order of the arm massage strength 1341, the leg massage strength 1342, the back massage strength 1343 and the sole massage strength 1344. However, according to Training data 2 1342, the massage settings 1340 for "weight training" of user 1 is 5, 4, 5 and 4. That is, User 1 prefers a massage concentrating on an upper body by weakening lower body massage strengths as compared to the default massage settings, after "weight training". Similarly, User 2 prefers a massage concentrating on a back, in which the back massage strength is strongest, after "weight training". In addition, User 3 prefers a massage concentrating on a lower body after "weight training".

Although only the part-by-part massage strength is shown as massage settings in FIG. 13, the present disclosure is not limited thereto. That is, the massage setting may include a part-by-part massage strength, a part-by-part massage time, a part-by-part massage order, a massage schedule, etc.

By learning the first recommended massage setting determination model using the training data including the massage setting distinguished between the users, the artificial intelligence massage apparatus 100 provide the recommended massage setting suitable for the activity of each user using the first recommended massage setting determination model.

FIG. 14 is a flowchart illustrating a method of determining a recommended massage setting according to an embodiment of the present disclosure.

Referring to FIG. 14, the processor 180 of the artificial intelligence massage apparatus 100 receives identification information from the terminal 300 of the user via the communication unit 110 (S1401). This step S1401 corresponds to step S701 of receiving the identification information from the terminal 300 of the user shown in FIG. 7.

In addition, the processor 180 of the artificial intelligence massage apparatus 100 identifies the user using the received identification information (S1403). This step S1403 corresponds to step S703 of identifying the user using the received identification information shown in FIG. 7.

In addition, the processor 180 of the artificial intelligence massage apparatus 100 receives the activity information of the identified user from the terminal 300 of the user or the heath care server 400 via the communication unit 110 (S1405). This step S1405 corresponds to step S705 of receiving the activity information of the identified user shown in FIG. 7.

In addition, the processor 180 of the artificial intelligence massage apparatus 100 receives at least one of biometric information of the user, outdoor environment information, indoor environment information or time information via the communication unit 110 (S1407).

The biometric information may include pulse, blood pressure, blood flow rate, body temperature, electrocardiogram, bioelectric sensor information, sleep time, etc. The sensor unit 140 of the artificial intelligence massage apparatus 100 or the sensor unit (not shown) of the terminal 300 of the user may generate biometric information of the user using at least one sensor and the terminal 300 may transmit the generated biometric information to the heath care server 400. In addition, the processor 180 may receive the biometric information of the identified user from the terminal 300 of the user or the heath care server 400 via the communication unit 110 or receive the biometric information of the identified user from the sensor unit 140.

The outdoor environment information may mean weather information and may include weather condition, outdoor temperature, outdoor humidity, etc. The processor 180 may receive the weather information from the terminal 300 of the user or the weather server 500 via the communication unit 110.

The indoor environment information may mean the internal environment information of a space where the artificial intelligence massage apparatus 100 is mounted and may include indoor temperature, indoor humidity, etc. The sensor unit 140 of the artificial intelligence massage apparatus 100, the sensor unit (not shown) of the terminal 300 of the user or an Internet of Things (IoT) apparatus (not shown) may generate indoor environment information using at least one sensor. In addition, the processor 180 may receive the generated indoor environment information from the terminal 300 of the user or the IoT apparatus (not shown) via the communication unit or receive the generated indoor environment information from the sensor unit 140.

The time information may mean information on a current time and include season, date, a current time, etc.

In addition, the processor 180 of the artificial intelligence massage apparatus 100 determines the recommended massage setting in consideration of the received information (S1409).

The recommended massage setting may include a recommended massage course and a massage course detailed setting. The massage course detailed setting may include a massage schedule setting, an additional function setting, a massage part setting, a massage order setting, a massage strength setting, a massage time setting, etc. The massage function setting may include various additional function settings such as a heating function, a cooling function, a multimedia function, etc. The heating/cooling function setting may include whether the heating/cooling function is used and the strength of the heating/cooling function.

The received information may include at least one of the activity information of the identified user received in step S1405 or the biometric information of the identified user, the outdoor environment information, the indoor environment information or the time information received in step S1407.

The processor 180 may determine the recommended massage setting based only on the received information, or may determine the recommended massage setting based on the user identification information (e.g., user ID) of the identified user, the received information and a massage setting log of the identified user, in order to determine the recommended massage setting according to user preference.

The memory 170 may store default massage setting values corresponding to the activity information, the biometric information, the outdoor environment information, the indoor environment information or the time information. In addition, the processor 180 may determine the default massage setting value as a recommended massage setting value if the user is not identified or if there is no massage setting log of the identified user.

The processor 180 may determine the recommended massage setting from the user identification information, the activity information, the biometric information, the outdoor environment information, the indoor environment information and the time information using the second recommended massage setting determination model stored in the memory 170. Alternatively, the processor 180 may transmit, to the artificial intelligence server 200, the user identification information, the activity information, the biometric information, the outdoor environment information, the indoor environment information and the time information via the communication unit 110, and, when the processor 260 of the artificial intelligence server 200 determines the recommended massage operation setting from the user identification information, the activity information, the biometric information, the outdoor environment information, the indoor environment information and the time information using the second recommended massage setting determination model stored in the memory 230, the processor 180 may receive, from the artificial intelligence server 200, the determined recommended massage setting via the communication unit 110.

The second recommended massage setting determination model may output the recommended massage setting suitable for the massage setting log of the user, when at least one of the activity information, the biometric information, the outdoor environment information, the indoor environment information or the time information is input along with the user identification information. In addition, the second recommended massage setting determination model may output the recommended massage setting having the default massage setting value corresponding to the condition, when at least one of the activity information, the biometric information, the outdoor environment information, the indoor environment information or the time information is input without the user identification information. The second recommended massage setting determination model includes an artificial neural network and may be learned using a machine learning algorithm or a deep learning algorithm.

The second recommended massage setting determination model may be learned using default training data without distinction of the user and personalized training data distinguished between the users. The default training data may include at least one of the activity information, the biometric information, the outdoor environment information, the indoor environment information or the time information, and a default massage setting value as label information. The personalized training data may include user identification information of a specific user, at least one of the activity information of the specific user, the biometric information, the outdoor environment information, the indoor environment information or the time information, and a user massage setting value as label information. That is, the massage setting log of the user is used to generate the personalized training data and thus the massage setting log of the user is applied to the second recommended massage setting determination model. As the second recommended massage setting determination model is learned using the above-described default training data and the personalized training data, the second recommended massage setting determination model may determine the default massage setting value as the recommended massage setting value with respect to an unidentified user or a user without a usage log, and determine, as the recommended massage setting value, the massage setting value determined based on at least one of the activity information of the user, the biometric information, the outdoor environment information, the indoor environment information or the time information and the massage setting log with respect to the identified user with the usage log.

In addition, the processor 180 of the artificial intelligence massage apparatus 100 controls the driving unit 190 based on the determined recommended massage setting (S1411). This step S1411 corresponds to step S709 of controlling the driving unit based on the determined recommended massage setting shown in FIG. 7.

The order of steps shown in FIG. 14 is merely an example and the present disclosure is not limited thereto. That is, in one embodiment, the order of some of the steps shown in FIG. 14 may be changed. In addition, in one embodiment, some of the steps shown in FIG. 14 may be performed in parallel.

Figure 15:
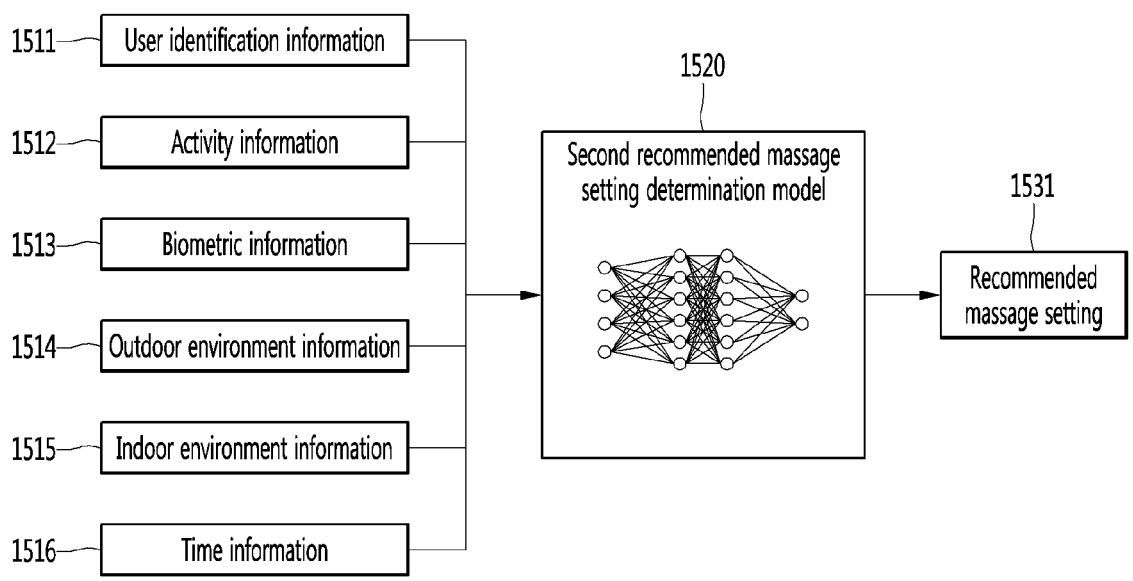
FIG. 15 is a view illustrating a method of determining a recommended massage setting according to an embodiment of the present disclosure.

FIG. 15 is a view illustrating a method of determining a recommended massage setting according to an embodiment of the present disclosure.

Referring to FIG. 15, the artificial intelligence massage apparatus 100 may determine a recommended massage setting 1531 from at least one of activity information 1512, biometric information 1513, outdoor environment information 1514, indoor environment information 1515 or time information 1516 along with user identification information 1511 using a second recommended massage setting determination model 1520.

The second recommended massage setting determination model 1520 may include an artificial neural network and may be learned using a machine learning algorithm or a deep learning algorithm. Training data used for learning of the second recommended massage setting determination model 1520 may include at least one of the user identification information 1511, the activity information 1512, the biometric information 1513, the outdoor environment information 1514, the indoor environment information 1515 or the time information 1516 and a massage setting or massage setting values as label information. The second recommended massage setting determination model 1520 may be learned to output the recommended massage setting following the massage setting values included in training data corresponding thereto, when the user identification information 1511 and at least one of the activity information 1512, the biometric information 1513, the outdoor environment information 1514, the indoor environment information 1515 or the time information 1516 are given.

For example, if a specific user complains of a backache on a rainy day than usual and sets the back massage strength to be higher than usual, the second recommended massage setting determination model 1520 may determine a recommended massage setting for setting the back massage strength of the user to be higher on the rainy day. In addition, if a specific user uses a heating function when an indoor temperature is below 24° C. and uses a cooling function when an indoor temperature is above 28° C., the second recommended massage setting determination model 1520 may determine a recommended massage setting which uses the heating function or the cooling function with respect to the user depending on whether the indoor temperature is above 28° C. or below 24° C. In addition, if a specific user sets a massage time about 20 percent longer than usual when a sleep time is less than 6 hours, the second recommended massage setting determination model 1520 may determine a recommended massage setting for setting the massage time about 20 percent longer when the sleep time of the user is less than 6 hours. In addition, if it is determined that a specific user is going out at 8:30 AM, the second recommended massage setting determination model 1520 may determine a recommended massage setting for setting a massage time in consideration of a current time and a time when the user is supposed to go out.

The second recommended massage setting determination model 1520 may be learned in the processor 180 or the learning processor 130 of the artificial intelligence massage apparatus 100 and stored in the memory 170 of the artificial intelligence massage apparatus 100, or may be learned in the processor 260 or the learning processor 240 of the artificial intelligence server 200 and stored in the memory 170 of the artificial intelligence massage apparatus 100. Alternatively, the second recommended massage setting determination model 1520 may be learned in the processor 260 or the learning processor 240 of the artificial intelligence server 200 and stored in the memory 230 of the artificial intelligence server 200.

If the second recommended massage setting determination model 1520 is stored in the memory 170 of the artificial intelligence massage apparatus 100, the processor 180 of the artificial intelligence massage apparatus 100 may determine a recommended massage setting 1531 using the second recommended massage setting determination model 1520 stored in the memory 170.

Alternatively, if the second recommended massage setting determination model 1520 is not stored in the memory 170 of the artificial intelligence massage apparatus 100, the processor 180 of the artificial intelligence massage apparatus 100 may receive the second recommended massage setting determination model 1520 from the artificial intelligence server 200 via the communication unit 110, store the second recommended massage setting determination model 1520 in the memory 170, and determine the recommended massage setting 1531 using the second recommended massage setting determination model 1520 stored in the memory 170.

Alternatively, if the second recommended massage setting determination model 1520 is not stored in the memory 170 of the artificial intelligence massage apparatus 100, the processor 180 of the artificial intelligence massage apparatus 100 may transmit, to the artificial intelligence server 200, the user identification information 1511 and at least one of the activity information 1512, the biometric information 1513, the outdoor environment information 1514, the indoor environment information 1515 or the time information 1516 via the communication unit 110, the processor 260 of the artificial intelligence server 200 may determine the recommended massage setting 1531 using the second recommended massage setting determination model 1520 stored in the memory 240, and the processor 180 of the artificial intelligence massage apparatus 100 may receive the recommended massage setting 1531 from the artificial intelligence server 200 via the communication unit 110.

Figure 16:
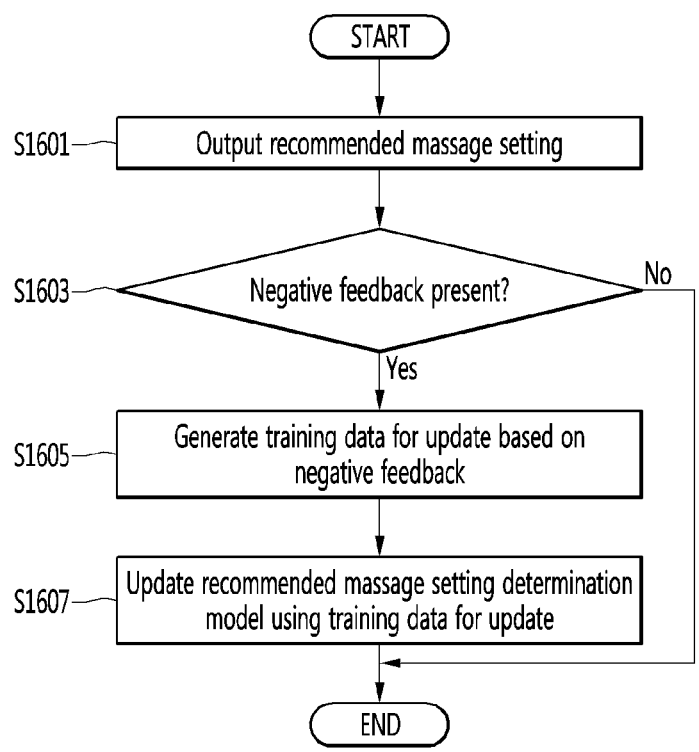
FIG. 16 is a flowchart illustrating a method of updating a recommended massage setting determination model according to an embodiment of the present disclosure.

FIG. 16 is a flowchart illustrating a method of updating a recommended massage setting determination model according to an embodiment of the present disclosure.

Referring to FIG. 16, the processor 180 of the artificial intelligence massage apparatus 100 outputs a recommended massage setting via the output unit 150 (S1601).

The processor 180 may output the determined recommended massage setting via the display unit 151 in the form of text or image or audibly output the determined recommended massage setting via the sound output unit 152. For example, the processor 180 may output the determined recommended massage setting "In the recommended massage setting, an arm massage strength is 5, a leg massage strength is 5, a back massage strength is 2 and a sole massage strength is 3" via the sound output unit 152.

In addition, the processor 180 of the artificial intelligence massage apparatus 100 determines whether negative feedback is present (S1603).

The negative feedback refers to the negative response of the user on the recommended massage setting output to the user and may include implicit feedback as well as explicit feedback. The negative feedback may include not only explicit negative evaluation of the user about the output recommended massage setting but also input of a new massage setting without using the output recommended massage setting.

Upon determining that negative feedback is present in step S1603, the processor 180 of the artificial intelligence massage apparatus 100 generates training data for update based on the negative feedback of the user (S1605), and updates the recommended massage setting determination model using the generated training data for update (S1607).

When the user inputs a massage setting different from the determined recommended massage setting, the processor 180 may generate the training data for update including the massage setting set by the user. If the training data for update of the first recommended massage setting determination model is generated, the processor 180 may generate first training data including the user identification information, the activity information of the user and the massage setting of the user as label information. If training data for update of the second recommended massage setting determination model is generated, the processor 180 may generate second training data including at least one of the activity information of the user, the biometric information, the outdoor environment information, the indoor environment information or the time information and the massage setting of the user as the label information along with the user identification information.

The processor 180 may update the recommended massage setting determination model using the training data for update generated directly or using the learning processor 130. Alternatively, the processor 180 may transmit the generated training data for update to the artificial intelligence server 200 via the communication unit 110, and the processor 260 or the learning processor 240 of the artificial intelligence server 200 may update the recommended massage setting determination model using the received training data for update.

Upon determining that negative feedback is not present in step S1603, the procedure ends.

Although the embodiment in which the recommended massage setting determination model is not updated when negative feedback is not present is described in FIG. 16, the present disclosure is not limited thereto. That is, in some embodiments, the training data for update may be generated based on positive feedback of the user and the recommended massage setting determination model may be updated using the generated training data for update.

Figure 17:
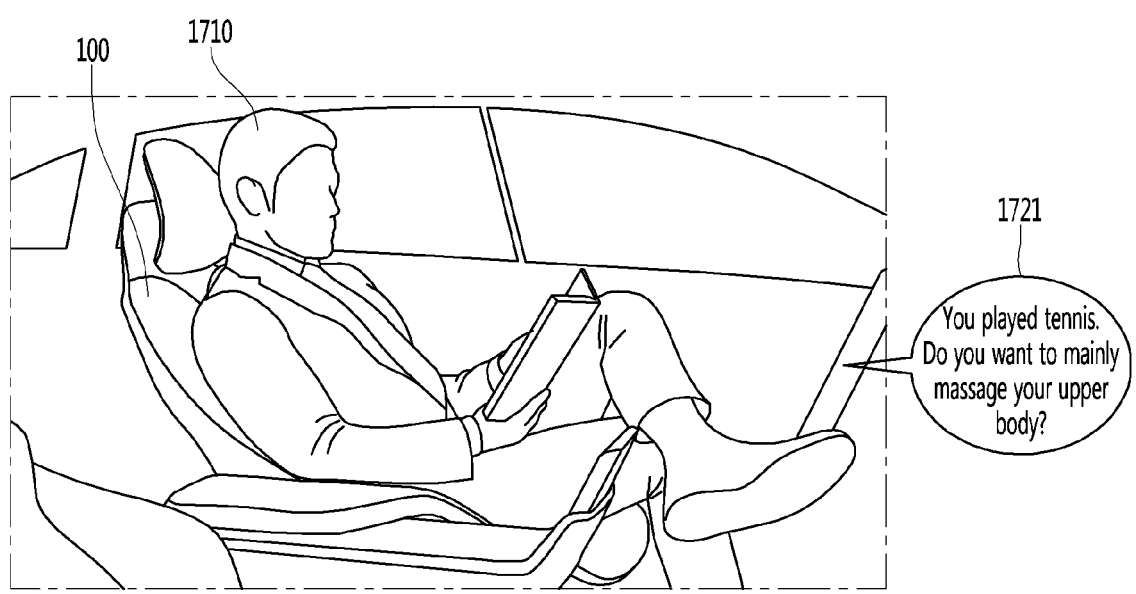
FIG. 17 is a view illustrating according to an embodiment of the present disclosure.

FIG. 17 is a view illustrating according to an embodiment of the present disclosure.

Referring to FIG. 17, the artificial intelligence massage apparatus 100 is a car seat, which may be mounted in an autonomous vehicle or may be configured as a part of an autonomous vehicle. Alternatively, the artificial intelligence massage apparatus 100 may be an autonomous vehicle and a massage unit 160 may configure a car seat. In this case, the processor 180 of the artificial intelligence massage apparatus 100 may be the processor of the autonomous vehicle and may be a processor different from the processor of the autonomous vehicle. If the processor 180 of the artificial intelligence massage apparatus 100 is different from the processor of the autonomous vehicle, the processor 180 may operate in conjunction with the processor of the autonomous vehicle. The artificial intelligence massage apparatus 100 may be limited in operation thereof to perform massage operation only when the autonomous vehicle autonomously travels for safety.

The processor 180 of the artificial intelligence massage apparatus 100 may receive, from the terminal 300 of the user or the heath care server 400, the activity information of a user 1710, and determine that the user 1710 played tennis before riding in the vehicle based on the received activity information. The processor 180 may determine a recommended massage setting for mainly massaging the upper body in consideration of the massage setting when the user 1710 plays tennis, and output the determined recommended massage setting "You played tennis. Do you want to mainly massage your upper body?" 1721 via the sound output unit 152. In addition, the processor 180 may control the driving unit 190 based on the response of the user 1710 to perform massage operation.

According to various embodiments of the present disclosure, a user may receive a recommended massage setting suitable for activity information thereof and get a massage suitable for a user's state without inputting a separate massage setting.

According to various embodiments of the present disclosure, a user may receive a recommended massage setting suitable for biometric information, outdoor environment information, indoor environment information or time information as well as activity information thereof and thus get a satisfactory massage.

According to an embodiment of the present disclosure, the above-described method may be implemented as a processor-readable code in a medium where a program is recorded. Examples of a processor-readable medium may include hard disk drive (HDD), solid state drive (SSD), silicon disk drive (SDD), read-only memory (ROM), random access memory (RAM), CD-ROM, a magnetic tape, a floppy disk, and an optical data storage device.

Other implementations are within the scope of the following claims.

What is claimed is:

1. An artificial intelligence massage apparatus for determining a recommended massage setting, comprising:
   a communication modem;
   a driver comprising at least one motor; and
   a processor configured to:
      receive, via the communication modem, identification information from a terminal of a user;
      identify the user using the received identification information,
      receive, via the communication modem, at least one of activity information of the identified user, biometric information of the identified user, outdoor environment information, indoor environment information or time information from the terminal or a health care server,
      determine a recommended massage setting in consideration of the received activity information, the received biometric information, the received outdoor environment information, the received indoor environment, or the received time information, and
      control the driver based on the determined recommended massage setting.

2. The artificial intelligence massage apparatus of claim 1, wherein the recommended massage setting includes at least one of a part-by-part massage strength, a part-by-part massage time, a part-by-part massage order or an additional function setting, and
   wherein the additional function setting includes at least one of a heating function setting, a cooling function setting or a multimedia function setting.

3. The artificial intelligence massage apparatus of claim 2, wherein the processor is configured to determine the recommended massage setting from user identification information and activity information of the user using a first recommended massage setting determination model, and
   wherein the first recommended massage setting determination model includes an artificial neural network, and is learned using a machine learning algorithm or a deep learning algorithm.

4. The artificial intelligence massage apparatus of claim 3, wherein the first recommended massage setting determination model is learned using default training data including a recommended massage setting of an unidentified user or a user without a usage log and personalized training data including a user-by-user recommended massage setting, and
   wherein the personalized training data is generated from the massage setting log of the identified user.

5. The artificial intelligence massage apparatus of claim 4, further comprising:
   an input interface; and
   an output interface,
   wherein the processor is configured to:
      output the determined recommended massage setting via the output interface,
      generate training data for update based on negative feedback if negative feedback on the determined recommended massage setting is received via the input interface, and
      update the first recommended massage setting determination model using the generated training data for update.

6. The artificial intelligence massage apparatus of claim 1, wherein the processor is configured to determine the recommended massage setting from at least one of the identification information, activity information and biometric information of the user, the outdoor environment information, the indoor environment information or the time information using a second recommended massage setting determination model, and
   wherein the second recommended massage setting determination model includes an artificial neural network, and is learned using a machine learning algorithm or a deep learning algorithm.

7. The artificial intelligence massage apparatus of claim 1, wherein the activity information is generated based on at least one of sensor information collected via s sensor of the terminal, user input or schedule information of the user.

8. The artificial intelligence massage apparatus of claim 7, wherein the processor is configured to modify activity content of the received activity information in consideration of the schedule information.

9. The artificial intelligence massage apparatus of claim 1, wherein the communication modem is configured to communicate with the terminal using wireless communication technology, and
   wherein the processor is configured to:
      calculate a distance to the terminal based on a connection strength with the terminal, and
      identify the user when the terminal approaches within a predetermined distance.

10. The artificial intelligence massage apparatus of claim 1,
    wherein the communication modem includes a short-range communication tag using short-range communication technology, and is configured to communicate with the terminal tagged with the short-range communication tag, and
    wherein the processor is configured to identify the user when the terminal is connected via the short-range communication tag.

11. The artificial intelligence massage apparatus of claim 1, wherein the artificial intelligence massage apparatus is mounted in an autonomous vehicle or is configured as a part of the autonomous vehicle.

12. The artificial intelligence massage apparatus of claim 11, wherein the processor is configured to control the driver based on the determined recommended massage setting in a situation where the autonomous vehicle is autonomously traveling.

13. A method of setting a recommended massage setting, comprising:
    receiving, via a communication modem, identification information from a terminal of a user;
    identifying the user using the received identification information;
    receiving, via the communication modem, at least one of activity information of the identified user, biometric information of the identified user, outdoor environment information, indoor environment information, or time information from the terminal or a health care server;

determining a recommended massage setting in consideration of at least one of the received activity information, the received biometric information, the received outdoor environment information, the received indoor environment information, or the received time information; and controlling a driver including at least one motor based on the determined recommended massage setting.

14. The method of claim 13, wherein the recommended massage setting includes at least one of a massage strength value corresponding to each body part, a massage time corresponding to each body part, a massage order for each body part, or an additional function setting, and wherein the additional function setting includes at least one of a heating function setting, a cooling function setting, or a multimedia function setting.

15. The method of claim 14, further comprising determining the recommended massage setting from the received identification information and the received activity information of the user by using a first recommended massage setting determination model, and wherein the first recommended massage setting determination model includes an artificial neural network, and is trained using machine learning.

16. The method of claim 15, wherein the first recommended massage setting determination model is trained using default training data including a recommended massage setting of an unidentified user or a user without a usage log, and personalized training data including a user-specific recommended massage setting, and wherein the personalized training data is generated from a massage setting log of the identified user.

17. The method of claim 16, further comprising:
outputting the determined recommended massage setting via an output interface;
generating training data based on feedback when feedback on the determined recommended massage setting is received via an input interface; and
updating the first recommended massage setting determination model using the generated training data.

18. A non-transitory recording medium having recorded thereon a computer program for controlling a processor to perform a method for determining a recommended massage setting, the method comprising:
receiving, via a communication modem, identification information from a terminal of a user;
identifying the user using the received identification information;
receiving, via the communication modem, at least one of activity information of the identified user, biometric information of the identified user, outdoor environment information, indoor environment information or time information from the terminal or a health care server,
determining a recommended massage setting in consideration of the received activity information, the received biometric information, the received outdoor environment information, the received indoor environment, or the received time information, and
controlling a driver including at least one motor based on the determined recommended massage setting.

* * * * *